United States Patent
Fei et al.

(10) Patent No.: US 12,250,630 B2
(45) Date of Patent: Mar. 11, 2025

(54) SIGNAL SENDING AND RECEIVING METHOD, APPARATUS, AND DEVICE

(71) Applicant: HUAWEI TECHNOLOGIES CO., LTD., Guangdong (CN)

(72) Inventors: Yongqiang Fei, Shenzhen (CN); Juan Zheng, Beijing (CN); Hailong Hou, Beijing (CN); Chaojun Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 335 days.

(21) Appl. No.: 17/856,094

(22) Filed: Jul. 1, 2022

(65) Prior Publication Data
US 2022/0346012 A1 Oct. 27, 2022

Related U.S. Application Data

(63) Continuation of application No. PCT/CN2020/071019, filed on Jan. 8, 2020.

(51) Int. Cl.
*H04W 68/02* (2009.01)
*H04W 52/02* (2009.01)

(52) U.S. Cl.
CPC ....... *H04W 52/0229* (2013.01); *H04W 68/02* (2013.01)

(58) Field of Classification Search
CPC ......... H04W 52/0216; H04W 52/0219; H04W 52/0229; H04W 52/0235; H04W 52/028; H04W 68/02; Y02D 30/70
See application file for complete search history.

(56) References Cited

U.S. PATENT DOCUMENTS

| | | | |
|---|---|---|---|
| 11,844,021 B2 * | 12/2023 | Koskinen | H04W 52/0235 |
| 2014/0348090 A1 * | 11/2014 | Nguyen | H04W 72/23 370/329 |
| 2018/0279274 A1 * | 9/2018 | Sun | H04W 52/367 |
| 2019/0297577 A1 | 9/2019 | Lin et al. | |

(Continued)

FOREIGN PATENT DOCUMENTS

| | | | |
|---|---|---|---|
| CN | 108633070 A | 10/2018 | |
| CN | 110299978 A | 10/2019 | |

(Continued)

OTHER PUBLICATIONS

Office Action in Chinese Appln. No. 202080053321.1, dated May 22, 2023, 8 pages.

(Continued)

*Primary Examiner* — Siu M Lee
(74) *Attorney, Agent, or Firm* — Fish & Richardson P.C.

(57) ABSTRACT

The present disclosure provides example signal sending and receiving methods, apparatuses, and devices. One example signal sending method includes a network device sending a first wake-up signal to indicate a terminal device to receive a first data channel, where the first data channel carries at least one of a paging message or a short message, and the short message indicates at least one of whether a system message changes or whether to receive earthquake and tsunami warning system (ETWS) information or commercial mobile alert service (CMAS) information. The first data channel is sent by the network device.

20 Claims, 11 Drawing Sheets

(56) References Cited

U.S. PATENT DOCUMENTS

| | | | | |
|---|---|---|---|---|
| 2019/0312758 A1* | 10/2019 | Liu | ................... | H04W 52/0216 |
| 2020/0029302 A1* | 1/2020 | Cox | ................... | H04W 52/0216 |
| 2020/0107267 A1* | 4/2020 | Wu | ...................... | H04W 76/28 |
| 2020/0229095 A1* | 7/2020 | Shrestha | ................ | H04W 68/00 |
| 2021/0337504 A1* | 10/2021 | Gao | ...................... | H04L 1/1819 |
| 2022/0346012 A1 | 10/2022 | Fei et al. | | |

FOREIGN PATENT DOCUMENTS

| | | | | |
|---|---|---|---|---|
| EP | 4064765 A4 | 12/2022 | | |
| WO | 2018175760 A1 | 9/2018 | | |
| WO | 2018201482 A1 | 11/2018 | | |
| WO | WO-2019063336 A1 * | 4/2019 | ........ | H04W 28/0268 |
| WO | 2021138854 A1 | 7/2021 | | |

OTHER PUBLICATIONS

Nokia et al., "Consideration on the usage of LTE control channel region," 3GPP TSG RAN WG1 Meeting #94bis, R1-1811071, Chengdu, China, Oct. 8-12, 2018, 3 pages.

PCT International Search Report and Written Opinion issued in International Application No. PCT/CN2020/071019 on Sep. 27, 2020, 16 pages (with English translation).

Extended European Search Report in European Appln No. 20911808.2, dated Nov. 4, 2022, 7 pages.

Office Action in Canadian Appln. No. 3,162,677, mailed on Aug. 12, 2024, 4 pages.

* cited by examiner

SIGNAL SENDING AND RECEIVING METHOD, APPARATUS, AND DEVICE

CROSS-REFERENCE TO RELATED APPLICATIONS

This application is a continuation of International Application No. PCT/CN2020/071019, filed on Jan. 8, 2020. The disclosure of which is hereby incorporated by reference in its entirety.

TECHNICAL FIELD

This application relates to the field of mobile communication technologies, and in particular, to a signal sending and receiving method, an apparatus, and a device.

BACKGROUND

In a new radio (NR) system, a base station may send paging messages to terminal devices in a radio resource control (RRC) idle mode, a sleeping mode, or an inactive mode, to initiate paging to the terminal devices and perform data transmission. Generally, when the base station needs to page a terminal device, the base station sends downlink control information (DCI) on one or more paging occasions (POs), to indicate a resource carrying a paging message. The terminal device receives/performs detection of/listens to (detects) the DCI on the one or more POs in one paging periodicity, to receive the paging message, and determines whether the base station pages the terminal device. It can be learned that in a process in which the terminal device listens to the paging message, a large amount of blind detection, namely, DCI blind detection, needs to be performed, and a large amount of data needs to be stored and demodulated. Consequently, this process usually causes a large amount of energy consumption, and shortens a battery life of the terminal device.

In a long term evolution (LTE) system, to reduce energy consumption of a terminal device, a wake-up signal (WUS) is introduced. If a base station needs to page a terminal device on a PO, the base station sends a WUS before the PO, to wake up the terminal device. The terminal device may determine, through WUS detection, whether to perform detection of a paging message.

After the WUS is added to a paging mechanism, although it is helpful for the terminal device to save energy when "the terminal device is not actually paged", it is unhelpful for the base station to save energy and reduce transmission overheads. This is because each time the base station needs to page a terminal device, the base station always needs to additionally send a WUS. In addition, for the terminal device, if the WUS indicates that the terminal device needs to receive the paging message, actual energy consumption of the terminal device includes three parts: "WUS detection", "DCI detection", and "physical downlink shared channel (PDSCH) receiving and demodulation". Compared with the solution without the WUS, in this solution, energy consumption increases, to be specific, additional energy consumption for the "WUS detection" is caused.

It can be learned that the current paging mechanism causes large energy consumption to both the base station and the terminal device.

SUMMARY

Embodiments of this application provide a signal sending and receiving method, an apparatus, and a device, to reduce energy consumption of a network device and a terminal device in a paging process.

According to a first aspect, a signal sending method is provided. The method includes: sending a first wake-up signal, where the first wake-up signal is used to indicate a terminal device to receive a first data channel, the first data channel carries a paging message and/or a short message, and the short message is used to indicate whether a system message changes and/or indicate whether to receive ETWS information or CMAS information; and sending the first data channel.

The method may be performed by a first communication apparatus. The first communication apparatus may be a communication device or a communication apparatus, for example, a chip, that can support the communication device in implementing a function required in the method. For example, the first communication apparatus is a network device, a chip that is disposed in the network device and that is configured to implement a function of the network device, or another component that is configured to implement the function of the network device. In the following description process, an example in which the first communication apparatus is the network device is used.

In embodiments of this application, if the network device needs to page the terminal device or send the short message to the terminal device, the network device only needs to send a wake-up signal for indication. After receiving the wake-up signal, the terminal device can receive the paging message and/or the short message, and the network device does not need to send DCI. Because the network device does not need to send the DCI, power consumption and resource overheads caused by sending the DCI are reduced. Because the terminal device does not need to perform DCI blind detection, power consumption caused by DCI blind detection is reduced. In addition, because the terminal device does not need to demodulate the DCI, power consumption caused by DCI demodulation is further reduced.

In an optional implementation, the first wake-up signal is one of K wake-up signals, the first data channel is one of N data channels, and both K and N are integers greater than or equal to 1, where K is equal to 1, and N is equal to 1;

K is equal to 1, N is greater than 1, and the N data channels are transmitted on a same detection occasion;

K is greater than 1, N is greater than 1, the N data channels are transmitted on a same detection occasion, and the K wake-up signals correspond to the N data channels;

K is equal to N, the N data channels correspond to one detection occasion, and the K wake-up signals are in one-to-one correspondence with the N data channels;

K is equal to 1, N is greater than 1, and the N data channels correspond to a plurality of detection occasions; or the N data channels correspond to M detection occasions, N=M*K, and the K wake-up signals are in one-to-one correspondence with K data channels on each of the M detection occasions.

There may be different correspondences between the K wake-up signals and the N data signals. For example, both K and N are equal to 1. In this manner, each data channel that may carry the paging message and/or the short message corresponds to one WUS that is before the data channel. If the terminal device detects a WUS, the terminal device may receive a data channel corresponding to the WUS, and a correspondence manner is clear. For another example, K is greater than 1, N is greater than 1, and the N data channels are transmitted on the same detection occasion. For example, a wake-up signal and a data channel may be in one-to-one correspondence, or one wake-up signal may correspond to a plurality of data channels, and all data channels corresponding to one WUS may be used to transmit same information, for example, transmit a same paging message, or transmit a same short message. In this case, if one WUS corresponds to a plurality of data channels, the terminal device only needs to receive one of the data channels, and does not need to receive all the data channels, to reduce power consumption of the terminal device. For example, the first WUS corresponds to a plurality of data channels. The terminal device may determine a data channel with a strongest signal in the plurality of data channels, receives only the data channel, and does not need to receive other data channels. Receiving the data channel with the strongest signal may help improve received signal quality. For another example, K is equal to 1, N is greater than 1, and the N data channels correspond to the plurality of detection occasions. The K wake-up signals may correspond to data channels that are on the plurality of detection occasions, so that an indication range of the K wake-up signals is wider.

In any one of the foregoing several manners, the network device may indicate, by sending the WUS, the terminal device to receive the paging message and/or the short message carried on a preconfigured/predefined resource, to avoid energy consumption and resource overheads for sending the DCI. The terminal device may accurately determine, based on the received WUS and a correspondence between a WUS and the preconfigured/predefined resource, resources on which the paging message and/or the short message need/needs to be received, to avoid energy consumption overheads caused by DCI blind detection, and reduce energy consumption overheads caused by unnecessary data channel buffering and demodulation.

In an optional implementation, the first wake-up signal and the first data channel are quasi co-located, or the first wake-up signal and a DMRS corresponding to the first data channel are quasi co-located.

There may be two cases in which the first WUS and the first data channel are quasi co-located. One case is that the first WUS and the first data channel are quasi co-located. The other case is that the first WUS and the DMRS corresponding to the first data channel are quasi co-located. This case may be considered as an indirect reflection of quasi co-location, to be specific, the first WUS and the DMRS corresponding to the first data channel are quasi co-located, and the first data channel and the DMRS are also quasi co-located, so that the first WUS and the first data channel are quasi co-located. That a WUS and a data channel are quasi co-located indicates that some transmission characteristics of a port sending the WUS are the same as those of a port sending the data channel. For example, one or more of the following parameters: an average gain, a receive spatial parameter, a Doppler frequency shift, a delay spread, or the like, of the data channel are the same as those of the WUS. An advantage of quasi co-location between the WUS and the data channel is that the terminal device may determine, based on the received WUS, signal strength of the data channel corresponding to the WUS. For example, if a signal of the WUS is strong, the terminal device may determine that a signal of the data channel corresponding to the WUS is strong; if a signal of the WUS is weak, the terminal device may determine that a signal of a data channel corresponding to the WUS is weak. Alternatively, an advantage is that the terminal device may adjust a receive beam based on the received WUS, to better receive the data channel corresponding to the WUS, so that received signal quality is improved.

In an optional implementation, the first data channel includes an indication field, and the indication field is used to indicate that the first data channel carries the paging message, carries the short message, or carries the paging message and the short message.

Content carried on the first data channel may be indicated by the indication field included in the first data channel. For example, different values (or different states of the bit field) of bits included in the indication field may be used to indicate different content. After receiving the first data channel, the terminal device may determine, based on a state of the indication field, content carried on the first data channel. The indication field included in the first data channel is used to indicate the content carried on the first data channel, so that the indication can be clearer.

In an optional implementation,
the first wake-up signal is a first-type wake-up signal, and is used to indicate that the first data channel includes the paging message and does not include the short message;
the first wake-up signal is a second-type wake-up signal, and is used to indicate that the first data channel includes the short message and does not include the paging message; or
the first wake-up signal is a third-type wake-up signal, and is used to indicate that the first data channel includes the paging message and the short message.

Content carried on the first data channel may alternatively be indicated by the WUS. For example, different types of WUSs may indicate different content carried on the first data channel. For example, the WUSs may be classified into different types based on transmission resources of the WUSs. For example, if one or more of time domain resources, frequency domain resources, or code domain resources of two WUSs are different, it is considered that types of the two WUSs are different. Different types of WUSs are used to indicate different content carried on the data channel, and there is no need to occupy a corresponding bit in the data channel for indication. This helps save a capacity of the data channel, so that the data channel can carry more information.

In an optional implementation, the first data channel includes a first field and a second field, where
when the first data channel does not include the paging message, the first field is reserved, and the second field is used to carry the short message; or when the first data channel does not include the short message, the second field is reserved, and the first field is used to carry the paging message; or
when the first data channel does not include the paging message and includes the short message, the first field and the second field are used to carry the short message; or when the first data channel does not include the short message and includes the paging message, the first field and the second field are used to carry the paging message.

For example, a manner of carrying a message on the first data channel is that a field carrying a message is always used to carry the message and is not used for another purpose, that is, the field is not reused, and the field is reserved if the message is not carried. In this way, when interpreting the data channel, the terminal device may identify an obtained message based on a corresponding field, so that the terminal device identifies the message more accurately. This also helps enable the terminal device to interpret the data channel according to a same rule, and implementation is simple. Alternatively, another manner of carrying a message on the first data channel is that a usage of a field is not unique, and the field may carry a message of one type and a message of another type, that is, the field can be reused. It may be considered that a field is not dedicated to carrying a specific message. For a field, if a data channel does not carry a message that the field should carry, the field may be alternatively used to carry another message. In this manner, transmission resource utilization can be improved, an encoding bit rate can be reduced as much as possible, and a bit error rate can also be reduced.

In an optional implementation, a transmission resource of the first data channel is predefined, or is configured based on a first message, the transmission resource includes one or more of a time domain resource, a frequency domain resource, or a modulation and demodulation scheme, and the first message is a system message or a radio resource control message.

In this embodiment of this application, because the DCI is no longer used, the transmission resource of the data channel needs to be indicated to the terminal device in another manner. For example, in a feasible indication method, the transmission resource of the data channel (for example, the first data channel) is configured based on the first message, the network device may send the first message to the terminal device, and after receiving the first message, the terminal device may determine the transmission resource of the data channel. The first message is, for example, higher layer signaling or a system message. Such a configuration manner may be considered as a semi-static configuration manner, and is flexible to some extent. Alternatively, in another feasible indication method, the transmission resource of the data channel (for example, the first data channel) is configured in a predefined manner. In this manner, the transmission resource of the data channel does not need to be configured by using signaling. This helps reduce signaling overheads.

According to a second aspect, a signal receiving method is provided. The method includes: receiving a first wake-up signal, where the first wake-up signal is used to indicate a terminal device to receive a first data channel, the first data channel carries a paging message and/or a short message, and the short message is used to indicate whether a system message changes and/or indicate whether to receive ETWS information or CMAS information; and performing detection of the first data channel.

The method may be performed by a second communication apparatus. The second communication apparatus may be a communication device or a communication apparatus, for example, a chip, that can support the communication device in implementing a function required in the method. For example, the second communication apparatus is the terminal device, a chip that is disposed in the terminal device and that is configured to implement a function of the terminal device, or another component that is configured to implement the function of the terminal device. In the following description process, an example in which the second communication apparatus is the terminal device is used.

In an optional implementation, the first wake-up signal is one of K wake-up signals, the first data channel is one of N data channels, and both K and N are integers greater than or equal to 1, where K is equal to 1, and N is equal to 1;

K is equal to 1, N is greater than 1, and the N data channels are transmitted on a same detection occasion;

K is greater than 1, N is greater than 1, the N data channels are transmitted on a same detection occasion, and the K wake-up signals correspond to the N data channels;

K is equal to N, the N data signals correspond to one detection occasion, and the K wake-up signals are in one-to-one correspondence with the N data signals;

K is equal to 1, N is greater than 1, and the N data signals correspond to a plurality of detection occasions; or the N data signals correspond to M detection occasions, N=M*K, and the K wake-up signals are in one-to-one correspondence with K data signals on each of the M detection occasions.

In an optional implementation, the first wake-up signal and the first data channel are quasi co-located, or the first wake-up signal and a DMRS corresponding to the first data channel are quasi co-located.

In an optional implementation, the first data channel includes an indication field, and the indication field is used to indicate that the first data channel carries the paging message, carries the short message, or carries the paging message and the short message.

In an optional implementation,
the first wake-up signal is a first-type wake-up signal, and is used to indicate that the first data channel includes the paging message and does not include the short message;
the first wake-up signal is a second-type wake-up signal, and is used to indicate that the first data channel includes the short message and does not include the paging message; or
the first wake-up signal is a third-type wake-up signal, and is used to indicate that the first data channel includes the paging message and the short message.

In an optional implementation, the first data channel includes a first field and a second field, where
when the first data channel does not include the paging message, the first field is reserved, and the second field is used to carry the short message; or when the first data channel does not include the short message, the second field is reserved, and the first field is used to carry the paging message; or
when the first data channel does not include the paging message and includes the short message, the first field and the second field are used to carry the short message; or when the first data channel does not include the short message and includes the paging message, the first field and the second field are used to carry the paging message.

In an optional implementation, a transmission resource of the first data channel is predefined, or is configured based on a first message, the transmission resource includes one or more of a time domain resource, a frequency domain resource, or a modulation and demodulation scheme, and the first message is a system message or a radio resource control message.

For technical effects brought by the second aspect or the possible implementations, refer to descriptions of the technical effects brought by the first aspect or the corresponding implementations.

According to a third aspect, a communication apparatus is provided. For example, the communication apparatus is the first communication apparatus described above. The first communication apparatus is configured to perform the method according to any one of the first aspect or the possible implementations. Specifically, the first communication apparatus may include modules configured to perform the method according to any one of the first aspect or the possible implementations, for example, include a processing module and a transceiver module. For example, the transceiver module may include a sending module and a receiving module. The sending module and the receiving module may be different functional modules, or may be a same functional module that can implement different functions. For example, the first communication apparatus is a communication device or a chip or another component disposed in the communication device. For example, the communication device is a network device. An example in which the first communication apparatus is the network device is used below. For example, the transceiver module may alternatively be implemented as a transceiver, and the processing module may alternatively be implemented as a processor. Alternatively, the sending module may be implemented as a transmitter, and the receiving module may be implemented as a receiver. The transmitter and the receiver may be different functional modules, or may be a same functional module that can implement different functions. If the first communication apparatus is a communication device, the transceiver is implemented as, for example, an antenna, a feeder, and a codec in the communication device. Alternatively, if the first communication apparatus is a chip disposed in the communication device, the transceiver (or the transmitter and the receiver) is, for example, a communication interface in the chip, and the communication interface is connected to a radio frequency transceiver component in the communication device, to implement information receiving and sending by using the radio frequency transceiver component. In a description process of the third aspect, an example in which the first communication apparatus is the network device and includes the processing module and the transceiver module is still used for description.

The processing module is configured to send a first wake-up signal via the transceiver module, where the first wake-up signal is used to indicate a terminal device to receive a first data channel, the first data channel carries a paging message and/or a short message, and the short message is used to indicate whether a system message changes and/or indicate whether to receive ETWS information or CMAS information.

The processing module is further configured to send the first data channel via the transceiver module.

In an optional implementation, the first wake-up signal is one of K wake-up signals, the first data channel is one of N data channels, and both K and N are integers greater than or equal to 1, where
  K is equal to 1, and N is equal to 1;
  K is equal to 1, N is greater than 1, and the N data channels are transmitted on a same detection occasion;
  K is greater than 1, N is greater than 1, the N data channels are transmitted on a same detection occasion, and the K wake-up signals correspond to the N data channels;
  K is equal to N, the N data channels correspond to one detection occasion, and the K wake-up signals are in one-to-one correspondence with the N data channels;
  K is equal to 1, N is greater than 1, and the N data channels correspond to a plurality of detection occasions; or
  the N data channels correspond to M detection occasions, N=M*K, and the K wake-up signals are in one-to-one correspondence with K data channels on each of the M detection occasions.

In an optional implementation, the first wake-up signal and the first data channel are quasi co-located, or the first wake-up signal and a DMRS corresponding to the first data channel are quasi co-located.

In an optional implementation, the first data channel includes an indication field, and the indication field is used to indicate that the first data channel carries the paging message, carries the short message, or carries the paging message and the short message.

In an optional implementation,
  the first wake-up signal is a first-type wake-up signal, and is used to indicate that the first data channel includes the paging message and does not include the short message;
  the first wake-up signal is a second-type wake-up signal, and is used to indicate that the first data channel includes the short message and does not include the paging message; or
  the first wake-up signal is a third-type wake-up signal, and is used to indicate that the first data channel includes the paging message and the short message.

In an optional implementation, the first data channel includes a first field and a second field, where
  when the first data channel does not include the paging message, the first field is reserved, and the second field is used to carry the short message; or when the first data channel does not include the short message, the second field is reserved, and the first field is used to carry the paging message; or
  when the first data channel does not include the paging message and includes the short message, the first field and the second field are used to carry the short message; or when the first data channel does not include the short message and includes the paging message, the first field and the second field are used to carry the paging message.

In an optional implementation, a transmission resource of the first data channel is predefined, or is configured based on a first message, the transmission resource includes one or more of a time domain resource, a frequency domain resource, or a modulation and demodulation scheme, and the first message is a system message or a radio resource control message.

For technical effects brought by the third aspect or the possible implementations, refer to descriptions of the technical effects brought by the first aspect or the corresponding implementations.

According to a fourth aspect, a communication apparatus is provided. For example, the communication apparatus is the second communication apparatus described above. The second communication apparatus is configured to perform the method according to any one of the second aspect or the possible implementations. Specifically, the second communication apparatus may include modules configured to perform the method according to any one of the second aspect or the possible implementations, for example, include a processing module and a transceiver module. For example, the transceiver module may include a sending module and a receiving module. The sending module and the receiving module may be different functional modules, or may be a same functional module that can implement different functions. For example, the second communication apparatus is a communication device or a chip or another component disposed in the communication device. For example, the communication device is a terminal device. An example in which the second communication apparatus is the terminal device is used below. For example, the transceiver module may alternatively be implemented as a transceiver, and the processing module may alternatively be implemented as a processor. Alternatively, the sending module may be implemented as a transmitter, and the receiving module may be implemented as a receiver. The transmitter and the receiver may be different functional modules, or may be a same functional module that can implement different functions. If the second communication apparatus is a communication device, the transceiver is implemented as, for example, an antenna, a feeder, and a codec in the communication device. Alternatively, if the second communication apparatus is a chip disposed in the communication device, the transceiver (or the transmitter and the receiver) is, for example, a communication interface in the chip, and the communication interface is connected to a radio frequency transceiver component in the communication device, to implement information receiving and sending by using the radio frequency transceiver component. In a description process of the fourth aspect, an example in which the second communication apparatus is the terminal device and includes the processing module and the transceiver module is still used for description.

The transceiver module is configured to receive a first wake-up signal, where the first wake-up signal is used to indicate the terminal device to receive a first data channel, the first data channel carries a paging message and/or a short message, and the short message is used to indicate whether a system message changes and/or indicate whether to receive ETWS information or CMAS information.

The processing module is configured to perform detection of the first data channel via the transceiver module.

In an optional implementation, the first wake-up signal is one of K wake-up signals, the first data channel is one of N data channels, and both K and N are integers greater than or equal to 1, where K is equal to 1, and N is equal to 1;

K is equal to 1, N is greater than 1, and the N data channels are transmitted on a same detection occasion;

K is greater than 1, N is greater than 1, the N data channels are transmitted on a same detection occasion, and the K wake-up signals correspond to the N data channels;

K is equal to N, the N data signals correspond to one detection occasion, and the K wake-up signals are in one-to-one correspondence with the N data signals;

K is equal to 1, N is greater than 1, and the N data signals correspond to a plurality of detection occasions; or the N data signals correspond to M detection occasions, N=M*K, and the K wake-up signals are in one-to-one correspondence with K data signals on each of the M detection occasions.

In an optional implementation, the first wake-up signal and the first data channel are quasi co-located, or the first wake-up signal and a DMRS corresponding to the first data channel are quasi co-located.

In an optional implementation, the first data channel includes an indication field, and the indication field is used to indicate that the first data channel carries the paging message, carries the short message, or carries the paging message and the short message.

In an optional implementation, the first wake-up signal is a first-type wake-up signal, and is used to indicate that the first data channel includes the paging message and does not include the short message;

the first wake-up signal is a second-type wake-up signal, and is used to indicate that the first data channel includes the short message and does not include the paging message; or the first wake-up signal is a third-type wake-up signal, and is used to indicate that the first data channel includes the paging message and the short message.

In an optional implementation, the first data channel includes a first field and a second field, where when the first data channel does not include the paging message, the first field is reserved, and the second field is used to carry the short message; or when the first data channel does not include the short message, the second field is reserved, and the first field is used to carry the paging message; or when the first data channel does not include the paging message and includes the short message, the first field and the second field are used to carry the short message; or when the first data channel does not include the short message and includes the paging message, the first field and the second field are used to carry the paging message.

In an optional implementation, a transmission resource of the first data channel is predefined, or is configured based on a first message, the transmission resource includes one or more of a time domain resource, a frequency domain resource, or a modulation and demodulation scheme, and the first message is a system message or a radio resource control message.

For technical effects brought by the fourth aspect or the possible implementations, refer to descriptions of the technical effects brought by the second aspect or the corresponding implementations.

According to a fifth aspect, a communication apparatus is provided. For example, the communication apparatus is the first communication apparatus described above. The communication apparatus includes a processor. Optionally, the communication apparatus may further include a memory, configured to store computer instructions. The processor and the memory are coupled to each other, to implement the method according to any one of the first aspect or the possible implementations. Alternatively, the first communication apparatus may not include a memory, and the memory may be located outside the first communication apparatus. Optionally, the first communication apparatus may further include a communication interface, configured to communicate with another apparatus or device. The processor, the memory, and the communication interface are coupled to each other, to implement the method according to any one of the first aspect or the possible implementations. For example, when the processor executes the computer instructions stored in the memory, the first communication apparatus is enabled to perform the method according to any one of the first aspect or the possible implementations. For example, the first communication apparatus is a communication device or a chip or another component disposed in the communication device. For example, the communication device is a network device.

If the first communication apparatus is a communication device, the communication interface is implemented as, for example, a transceiver (or a transmitter and a receiver) in the communication device, and the transceiver is implemented as, for example, an antenna, a feeder, and a codec in the communication device. Alternatively, if the first communication apparatus is a chip disposed in the communication device, the communication interface is, for example, an input/output interface such as an input/output pin in the chip, and the communication interface is connected to a radio frequency transceiver component in the communication device, to implement information receiving and sending by using the radio frequency transceiver component.

According to a sixth aspect, a communication apparatus is provided. For example, the communication apparatus is the second communication apparatus described above. The communication apparatus includes a processor. Optionally, the communication apparatus may further include a memory, configured to store computer instructions. The processor and the memory are coupled to each other, to implement the method according to any one of the second aspect or the possible implementations. Alternatively, the second communication apparatus may not include a memory, and the memory may be located outside the second communication apparatus. Optionally, the second communication apparatus may further include a communication interface, configured to communicate with another apparatus or device. The processor, the memory, and the communication interface are coupled to each other, to implement the method according to any one of the second aspect or the possible implementations. For example, when the processor executes the computer instructions stored in the memory, the second communication apparatus is enabled to perform the method according to any one of the second aspect or the possible implementations. For example, the second communication apparatus is a communication device or a chip or another component disposed in the communication device. For example, the communication device is a terminal device.

If the second communication apparatus is a communication device, the communication interface is implemented as, for example, a transceiver (or a transmitter and a receiver) in the communication device, and the transceiver is implemented as, for example, an antenna, a feeder, and a codec in the communication device. Alternatively, if the second communication apparatus is a chip disposed in the communication device, the communication interface is, for example, an input/output interface such as an input/output pin in the chip, and the communication interface is connected to a radio frequency transceiver component in the communication device, to implement information receiving and sending by using the radio frequency transceiver component.

According to a seventh aspect, a chip is provided. The chip includes a processor and a communication interface. The processor is coupled to the communication interface, and is configured to implement the method provided in any one of the first aspect or the optional implementations.

Optionally, the chip may further include a memory. For example, the processor may read and execute a software program stored in the memory, to implement the method provided in any one of the first aspect or the optional implementations. Alternatively, a memory may not be included in the chip, but is located outside the chip. This is equivalent to that the processor may read and execute a software program stored in an external memory, to implement the method provided in any one of the first aspect or the optional implementations.

According to an eighth aspect, a chip is provided. The chip includes a processor and a communication interface. The processor is coupled to the communication interface, and is configured to implement the method provided in any one of the second aspect or the optional implementations.

Optionally, the chip may further include a memory. For example, the processor may read and execute a software program stored in the memory, to implement the method provided in any one of the second aspect or the optional implementations. Alternatively, a memory may not be included in the chip, but is located outside the chip. This is equivalent to that the processor may read and execute a software program stored in an external memory, to implement the method provided in any one of the second aspect or the optional implementations.

According to a ninth aspect, a first communication system is provided. The communication system includes the communication apparatus according to the third aspect, the communication apparatus according to the fifth aspect, or the communication apparatus according to the seventh aspect, and include the communication apparatus according to the fourth aspect, the communication apparatus according to the sixth aspect, or the communication apparatus according to the eighth aspect.

According to a tenth aspect, a computer-readable storage medium is provided. The computer-readable storage medium is configured to store computer instructions. When the computer instructions are run on a computer, the computer is enabled to perform the method according to any one of the first aspect or the possible implementations.

According to an eleventh aspect, a computer-readable storage medium is provided. The computer-readable storage medium is configured to store computer instructions. When the computer instructions are run on a computer, the computer is enabled to perform the method according to any one of the second aspect or the possible implementations.

According to a twelfth aspect, a computer program product including instructions is provided. The computer program product is configured to store computer instructions. When the computer instructions are run on a computer, the computer is enabled to perform the method according to any one of the first aspect or the possible implementations.

According to a thirteenth aspect, a computer program product including instructions is provided. The computer program product is configured to store computer instructions. When the computer instructions are run on a computer, the computer is enabled to perform the method according to any one of the second aspect or the possible implementations.

In embodiments of this application, if the network device needs to page the terminal device, the network device does not need to send the DCI. Because the network device does not need to send the DCI, power consumption and resource overheads caused by sending the DCI are reduced. Because the terminal device does not need to perform DCI blind detection, power consumption caused by DCI blind detection is reduced. In addition, because the terminal device does not need to demodulate the DCI, power consumption caused by DCI demodulation is further reduced.

DESCRIPTION OF EMBODIMENTS

Figure 1A:
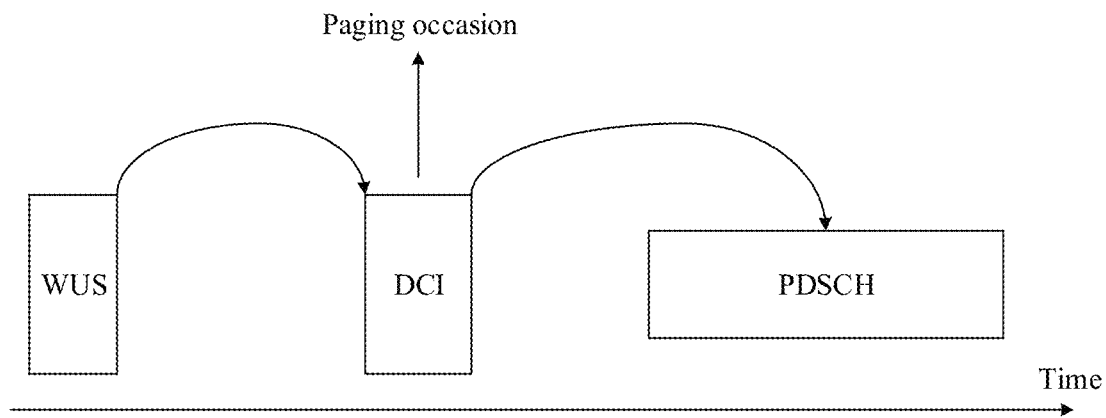
FIG. 1A is a schematic diagram in which a terminal device is to perform DCI detection and receive a PDSCH when the terminal device detects a WUS.

To make objectives, technical solution, and advantages of embodiments of this application clearer, the following further describes embodiments of this application in detail with reference to the accompanying drawings.

The following describes some terms in embodiments of this application, to facilitate understanding of a person skilled in the art.

(1) The terminal device includes a device that provides voice and/or data connectivity for a user, and specifically, includes a device that provides voice for the user, includes a device that provides data connectivity for the user, or includes a device that provides voice and data connectivity for the user. For example, the terminal device may include a handheld device having a wireless connection function or a processing device connected to a wireless modem. The terminal device may communicate with a core network through a radio access network (RAN), and exchange voice or data with the RAN, or exchange voice and data with the RAN. The terminal device may include user equipment (UE), a wireless terminal device, a mobile terminal device, a device-to-device (D2D) terminal device, a vehicle-to-everything (V2X) terminal device, a machine-to-machine/machine type communication (M2M/MTC) terminal device, Internet of Things (IoT) terminal device, a light terminal device (light UE), a reduced capability user equipment (reduced capability UE, REDCAP UE), a subscriber unit, a subscriber station, a mobile station, a remote station, an access point (AP), a remote terminal, an access terminal, a user terminal, a user agent, a user device, or the like. For example, the terminal device may be a mobile phone (or referred to as a "cellular" phone), a computer having a mobile terminal device, a portable, pocket-sized, handheld, or a computer-built-in mobile apparatus, or the like. For example, the terminal device may be a device such as a personal communications service (PCS) phone, a cordless telephone set, a session initiation protocol (SIP) phone, a wireless local loop (WLL) station, or a personal digital assistant (PDA). The terminal device alternatively includes a limited device, for example, a device having low power consumption, a device having a limited storage capability, or a device having a limited computing capability. For example, the terminal device includes an information sensing device such as a barcode, a radio frequency identification (RFID), a sensor, a global positioning system (GPS), or a laser scanner.

As an example instead of a limitation, the terminal device in embodiments of this application may alternatively be a wearable device. The wearable device may also be referred to as a wearable intelligent device, an intelligent wearable device, or the like, and is a general term of wearable devices that are intelligently designed and developed for daily wear by using a wearable technology, for example, glasses, gloves, watches, clothes, and shoes. The wearable device is a portable device that is directly worn on a body or integrated into clothes or an accessory of a user. The wearable device is not merely a hardware device, but is used to implement a powerful function through software support, data interaction, and cloud interaction. In a board sense, wearable intelligent devices include full-featured and large-sized devices that can implement complete or partial functions without depending on smartphones, for example, smart watches or smart glasses, and devices that focus on only one type of application function and need to work with other devices such as smartphones, such as various smart bands, smart helmets, or smart jewelry for monitoring physical signs.

If the various terminal devices described above are located on a vehicle (for example, placed in the vehicle or installed in the vehicle), the terminal devices all may be considered as vehicle-mounted terminal devices. The vehicle-mounted terminal devices are also referred to as, for example, on-board units (OBUs).

In embodiments of this application, the terminal device may further include a relay. Alternatively, it may be understood that any device that can perform data communication with a base station may be considered as a terminal device.

In embodiments of this application, an apparatus configured to implement a function of the terminal device may be a terminal device, or may be an apparatus that can support the terminal device in implementing the function, for example, a chip system. The apparatus may be installed in the terminal device. In embodiments of this application, the chip system may include a chip, or may include a chip and another discrete component. In the technical solution provided in embodiments of this application, an example in which the apparatus configured to implement the function of the terminal device is the terminal device is used to describe the technical solution provided in embodiments of this application.

(2) A network device includes, for example, an access network (AN) device, for example, a base station (for example, an access point), and may be a device that communicates with a wireless terminal device over an air interface in an access network by using one or more cells, or may be, for example, a road side unit (RSU) in a vehicle-to-everything (V2X) technology. The base station may be configured to mutually convert a received over-the-air frame and an IP packet, and serve as a router between the terminal device and a remaining part of an access network. The remaining part of the access network may include an IP network. The RSU may be a fixed infrastructure entity supporting a V2X application, and may exchange a message with another entity supporting the V2X application. The network device may further coordinate attribute management of the air interface. For example, the network device may include an evolved NodeB (eNB, or e-NodeB, evolved NodeB) in a long term evolution (LTE) system or a long term evolution-advanced (LTE-A) system, or may include a next generation NodeB (gNB) in a 5th generation (5G) mobile communication technology NR system (also referred to as an NR system for short), or may include a centralized unit (CU) and a distributed unit (DU) in a cloud radio access network (Cloud RAN) system. This is not limited in embodiments of this application.

The network device may further include a core network device. The core network device includes, for example, an access and mobility management function (AMF), a user plane function (UPF), or the like. Because embodiments of this application mainly relate to an access network device, the network device in the following is an access network device unless otherwise specified.

In embodiments of this application, an apparatus configured to implement a function of the network device may be a network device, or may be an apparatus that can support the network device in implementing the function, for example, a chip system. The apparatus may be installed in the network device. In the technical solution provided in embodiments of this application, an example in which the apparatus configured to implement the function of the network device is the network device is used to describe the technical solution provided in embodiments of this application.

(3) Discontinuous reception (DRX): In a DRX mechanism, a terminal device may periodically enter a sleep mode, and does not need to listen to a physical downlink control channel (PDCCH). Implementation mechanisms of DRX are different in three modes: an RRC idle mode, an RRC inactive mode, and an RRC connected mode. DRX in the RRC idle mode or the RRC inactive mode is also referred to as IDLE DRX. In IDLE DRX, the terminal device mainly listens to paging, and the terminal device listens to a paging occasion once in one DRX cycle. If the terminal device needs to transmit service data, the terminal device usually needs to enter the RRC connected mode from the RRC idle mode or the RRC inactive mode.

(4) "At least one" means one or more, and "a plurality of" means two or more. A term "and/or" describes an association relationship between associated objects and represents that three relationships may exist. For example, A and/or B may represent the following three cases: Only A exists, both A and B exist, and only B exists, where A and B may be singular or plural. The character "/" usually indicates an "or" relationship between the associated objects. "At least one of the following" or a similar expression thereof refers to any combination of these items, including any combination of a single item (piece) or a plurality of items (pieces). For example, at least one of a, b, or c may indicate: a, b, c, a and b, a and c, b and c, or a, b, and c, where a, b, and c may be singular or plural.

In addition, unless otherwise stated, ordinal numbers such as "first" and "second" in embodiments of this application are for distinguishing between a plurality of objects, but are not intended to limit an order, a time sequence, priorities, or importance of the plurality of objects. For example, a first wake-up signal and a second wake-up signal are merely used to distinguish between different wake-up signals, but do not indicate different content, priorities, sending sequences, importance degrees, or the like of the two wake-up signals.

The foregoing describes some concepts in embodiments of this application. The following describes technical features in embodiments of this application.

In a wireless communication system, for example, a 5th generation terrestrial cellular wireless communication system, namely, NR communication system, information exchanged between a terminal device and a base station is carried through a physical channel. Data sent by the base station, that is, downlink data, is usually carried through a PDSCH, and control information sent by the base station, that is, downlink control information, is usually carried through a physical downlink control channel (PDCCH). The base station may send a synchronization signal block (SSB). An SSB includes a primary synchronization signal (PSS), a secondary synchronization signal (SSS), and a physical broadcast channel (PBCH). The PSS and the SSS may enable the terminal device to synchronize with the base station, and the PBCH is used to carry a master information block (MIB). The base station may further send a channel state information reference signal (CSI-RS) for the terminal device to perform channel state measurement.

In the NR system, the base station may send paging messages to terminal devices in an RRC idle mode, a sleep mode, or an RRC inactive mode, to initiate paging to the terminal devices and perform data transmission. Generally, when the base station needs to page a terminal device, the base station sends DCI on one or more POs, to indicate a resource carrying a paging message. The DCI is scrambled by using a paging radio network temporary identity (P-RNTI). The PO includes a periodic paging search space and a periodic control resource set (CORESET). The terminal device receives/performs detection of/listens to the DCI on the one or more POs in one paging periodicity, to receive the paging message, and determines whether the base station pages the terminal device. A PO on which the terminal device needs to perform detection is determined through calculation based on an ID of the terminal device according to a predefined rule.

For example, a system frame number (SFN) of a paging frame (PF) including a PO on which the terminal device performs detection in a DRX cycle, an index of the PO in the PF corresponding to the SFN, and the like may be determined according to the following formulas.

The SFN of the PF satisfies the following formula.

$$(SFN + \text{PF\_offset}) \bmod T = \left(\frac{T}{N}\right) * (\text{UE\_ID} \bmod N) \quad \text{(Formula 1)}$$

An index $i_s$ of the PO corresponding to the SFN satisfies the following formula.

$$i_s = \text{floor}\left(\frac{\text{UE\_ID}}{N}\right) \bmod N_s \quad \text{(Formula 2)}$$

In the foregoing formulas, the SFN represents the system frame number of the paging frame, PF_offset represents a PF offset, T represents a DRX cycle, N represents a total quantity of PFs included in one DRX cycle, $N_s$ represents a quantity of POs included in one PF, mod represents a modulo operation, UE_ID represents a value obtained based on the ID of the terminal device, and floor(x) represents rounding x down to the nearest integer. $PF_{offset}$, T, N, and $N_s$ are all configured by the base station, and UE_ID is determined based on the ID of the terminal device. For example, UE_ID may be the last 10 bits of a 5G-short-temporary mobile subscriber identity (5G-S-TMSI) of the terminal device. In addition, because the NR system usually has an SSB-based beam sweeping feature, one PO may include s consecutive PDCCH detection occasions, where s is a quantity of SSBs actually sent by the base station in a half frame.

It can be learned that in a process in which the terminal device listens to the paging message, a large amount of blind detection, namely, DCI blind detection, needs to be performed, and a large amount of data needs to be stored and demodulated. Consequently, this process usually causes a large amount of energy consumption, and shortens a battery life of the terminal device. This paging mechanism is more unfavorable especially for a terminal device such as a machine type communication (MTC) terminal device. This is because such a terminal device usually needs to work for 3 to 10 years without replacing a battery. A typical MTC terminal device includes an enhanced machine type communication (enhanced MTC, eMTC) terminal device, a narrowband Internet of Things (NB-IoT) terminal device, or the like.

Therefore, in an LTE system, to reduce energy consumption of a terminal device, a WUS is introduced. If a base station needs to page a terminal device on a PO, the base station sends a WUS before the PO. The terminal device may determine, through WUS detection, whether to perform detection of a paging message. WUSs of an eMTC terminal device and an NB-IoT terminal device are generated by using a Gold sequence and a ZC sequence, and are cell-level common signals. Because the terminal device may complete WUS sequence detection by using a simple cross-correlation operation, a WUS detection process of the terminal device is simple, and energy consumption overheads of detection are low.

The WUS of the eMTC generally occupies two consecutive physical resource blocks (PRBs) in frequency domain, and occupies M consecutive subframes in time domain, where M may be configured by using RRC signaling. The WUS of the NB-IoT is similar to this, but occupies only one PRB in frequency domain.

The WUS is usually implemented in two manners. One manner is to indicate, by using existence of the WUS, whether to perform wake-up, to be specific, if the base station sends the WUS, it indicates that there is the paging message; if the base station does not send the WUS, it indicates that there is no paging message. In this case, the terminal device may determine, depending on whether the WUS is detected, whether detection of the paging message needs to be performed. In another manner of implementing the WUS, two states (for example, two different sequences) of the WUS are used to indicate whether to perform wake-up. To be specific, if the base station sends a WUS in one state, it indicates that there is a paging message; if the base station sends a WUS in the other state, it indicates that there is no paging message. In this case, the terminal device may determine, based on a state of the detected WUS, whether detection of the paging message needs to be performed.

In the LTE system, the first WUS mechanism is supported, in other words, existence of the WUS is used to indicate whether to perform wake-up. To be specific, the terminal device may first determine whether the WUS exists, to determine whether detection of the paging message needs to be performed on one or more POs. For example, if the terminal device does not detect the WUS, the terminal device may determine that the base station does not page the terminal device on the subsequent one or more POs. Therefore, the terminal device may continue to sleep, and does not need to perform blind detection, so that energy consumption overheads are reduced. However, if the terminal device detects the WUS, the terminal device may determine that the base station pages the terminal device on the subsequent one or more POs. Therefore, the terminal device may perform detection of the paging message.

Figure 1B:
FIG. 1B is a schematic diagram in which a terminal device does not need to perform DCI detection and does not need to receive a PDSCH when the terminal device does not detect a WUS.

FIG. 1A and FIG. 1B provide examples. It is assumed that existence of the WUS is used to indicate whether to perform wake-up, and one WUS corresponds to detection of a paging message on one PO. It can be learned from FIG. 1A that if the terminal device detects the WUS, the terminal device may perform detection of DCI in a CORESET corresponding to the PO corresponding to the WUS, and receive, based on scheduling of the DCI, the paging message carried on a PDSCH. It can be learned from FIG. 1B that if the terminal device does not detect the WUS, the terminal device does not need to perform detection of DCI or a PDSCH. For example, the terminal device may enter a sleep mode.

The WUS in the LTE system is mainly used to wake up a terminal device in an idle mode.

After the WUS is added to a paging mechanism, although it is helpful for the terminal device to save energy when "the terminal device is not actually paged", it is unhelpful for the base station to save energy and reduce transmission overheads. This is because each time the base station needs to page a terminal device, the base station always needs to additionally send a WUS. In addition, for the terminal device, if the WUS indicates that the terminal device needs to receive the paging message, actual energy consumption of the terminal device includes three parts: "WUS detection", "DCI detection", and "PDSCH receiving and demodulation". Compared with the solution without the WUS, in this solution, energy consumption increases, to be specific, additional energy consumption for the "WUS detection" is caused. Table 1 shows comparison between energy consumption of a mechanism with a WUS and energy consumption of a mechanism without a WUS.

TABLE 1

| Paging manner | | PDCCH + PDSCH | WUS + PDCCH + PDSCH |
| --- | --- | --- | --- |
| Energy consumption on a network side | When there is paging | Medium (Sending the PDCCH + the PDSCH) | Relatively high (Sending the WUS + the PDCCH + the PDSCH) |
| | When there is no paging | Low (Not sending the PDCCH or the PDSCH) | Low (Not sending the WUS, the PDCCH, or the PDSCH) |
| Energy consumption on a terminal device side | When there is paging | Medium (Blind DCI detection + PDSCH demodulation based on DCI) | High (WUS detection + blind DCI detection + PDSCH demodulation based on DCI) |
| | When there is no paging | Medium (Blind DCI detection) | Low (WUS detection) |

It can be learned that the current paging mechanism causes large energy consumption to both the base station and the terminal device.

In view of this, the technical solution in embodiments of this application are provided. In embodiments of this application, if a network device needs to page a terminal device or send a short message to the terminal device, the network device only needs to send a wake-up signal for indication. After receiving the wake-up signal, the terminal device can receive a paging message and/or the short message, and the network device does not need to send DCI. Because the network device does not need to send the DCI, power consumption and resource overheads caused by sending the DCI are reduced. Because the terminal device does not need to perform DCI blind detection, power consumption caused by DCI blind detection is reduced. In addition, because the terminal device does not need to demodulate the DCI, power consumption caused by DCI demodulation is further reduced.

The technical solution provided in embodiments of this application may be applied to a 4th generation (4G) mobile communication technology system, for example, an LTE system, or may be applied to a 5G system, for example, an NR system, or may be applied to a next-generation mobile communication system or another similar communication system, provided that one entity can initiate paging to another entity. This is not specifically limited. In addition, an air interface communication process between the network device and the terminal device is used as an example in a description process of embodiments of this application. Actually, the technical solution provided in embodiments of this application may also be applied to a sidelink (SL), provided that one terminal device can initiate paging to another terminal device. For example, the technical solution provided in embodiments of this application may be applied to a device-to-device (D2D) scenario that may be an NR D2D scenario, an LTE D2D scenario, or the like, may be applied to a vehicle-to-everything (V2X) scenario that may be an NR V2X scenario, an LTE V2X scenario, or the like, for example, may be applied to the Internet of Vehicles, for example, V2X, LTE-V, and vehicle-to-vehicle (V2V), or may be used in fields such as intelligent driving and intelligent connected vehicles.

Figure 2:
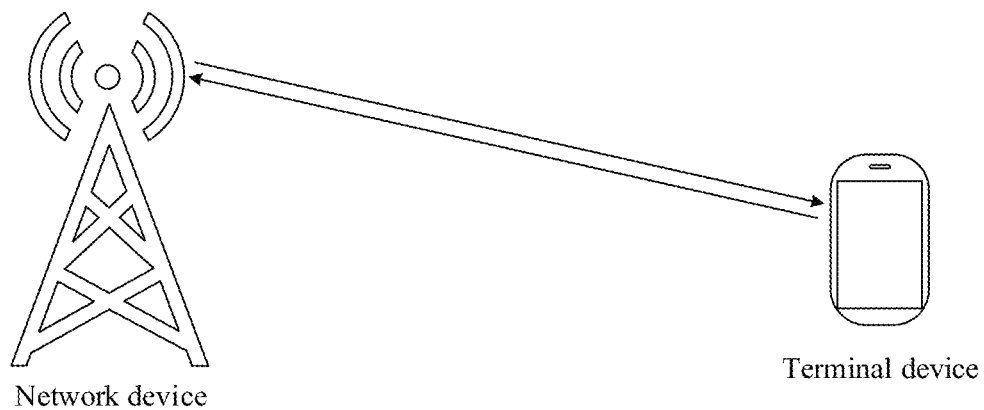
FIG. 2 is a schematic diagram of an application scenario according to an embodiment of this application.

FIG. 2 shows an application scenario according to an embodiment of this application. In FIG. 2, a network device serves a terminal device in a wireless transmission manner. The network device may initiate paging to the terminal device.

The network device in FIG. 2 is, for example, a base station. The base station corresponds to a different device in a different system. For example, in a 4G system, the base station may correspond to a base station in 4G, for example, an eNB. In a 5G system, the base station corresponds to a base station in 5G, for example, a gNB. Certainly, the technical solution provided in embodiments of this application may also be applied to a future mobile communication system. Therefore, the network device in FIG. 2 may alternatively correspond to an access network device in the future mobile communication system. In FIG. 2, an example in which the network device is the base station is used. Actually, with reference to the foregoing descriptions, the network device may alternatively be a device such as an RSU. In addition, an example in which the terminal device in FIG. 2 is a mobile phone is used. Actually, it can be learned from the foregoing descriptions of the terminal device that the terminal device in embodiments of this application is not limited to the mobile phone.

The following describes the method provided in embodiments of this application with reference to the accompanying drawings. The "data channel" in embodiments of this application is, for example, a PDSCH, or may be another data channel.

Figure 3:
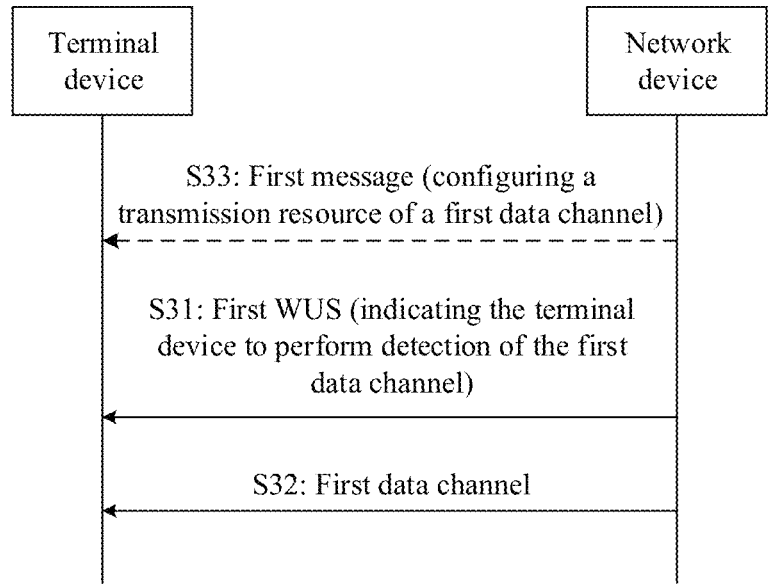
FIG. 3 is a flowchart of a signal sending and receiving method according to an embodiment of this application.

An embodiment of this application provides a signal sending and receiving method. FIG. 3 is a flowchart of the method. In the following description process, an example in which the method is applied to a network architecture shown in FIG. 2 is used.

For ease of description, the following uses an example in which the method is performed by a network device and a terminal device. Because this embodiment uses an example in which the method is applied to the network architecture shown in FIG. 2, the network device described below may be the network device in the network architecture shown in FIG. 2, and the terminal device described below may be the terminal device in the network architecture shown in FIG. 2.

S31: The network device sends a first WUS, and the terminal device receives the first WUS from the network device.

Optionally, the first WUS may be one of K WUSs. The K WUSs are used to indicate N data channels, in other words, the K WUSs correspond to the N data channels, where one WUS may correspond to one or more data channels. The N data signals include a first data channel. For example, the first WUS corresponds to the first data channel. The first WUS may correspond to only one data channel, namely, the first data channel. Alternatively, the first WUS may correspond to a plurality of data channels, and the first data channel is one of the plurality of data channels. That the first WUS corresponds to the first data channel may be understood as follows: The first WUS may indicate the terminal device to receive (or perform detection of) the first data channel. In other words, if the terminal device detects the first WUS, the terminal device may determine to receive the first data channel.

In embodiments of this application, a WUS may be a signal generated in any manner. For example, the WUS may be a sequence-based signal. The sequence-based WUS allows the terminal device to perform sequence detection in a cross-correlation manner. Therefore, implementation is simple, and energy consumption is low. For example, the WUS may be a WUS generated based on a Gold sequence, a WUS generated based on a Zadoff-Chu (ZC) sequence, or a signal generated in another predefined manner. This is not excessively limited in embodiments of this application. For the WUS generated based on the Gold sequence, the network device needs to indicate an initial phase of the sequence, so that both the network device and the terminal device can determine the WUS based on the initial phase. For the WUS generated based on the ZC sequence, the network device may indicate a root and a cyclic shift value of the sequence, so that both the network device and the terminal device can determine the WUS based on the root and the cyclic shift value. In addition, the network device further needs to indicate a transmission resource carrying the WUS, for example, indicate a slot or a physical resource block (PRB) carrying the WUS, so that the terminal device correctly performs detection of the WUS.

In a conventional technology, a network device indicates, based on DCI on a PDCCH, a resource occupied by a PDSCH carrying a paging message. In contrast, because DCI is no longer used in embodiments of this application, a transmission resource of a data channel needs to be indicated to the terminal device in another manner. For example, in a feasible indication method, the transmission resource of the data channel (for example, the first data channel) is configured based on a first message. Refer to S33, the network device may send the first message to the terminal device, and after receiving the first message, the terminal device may determine the transmission resource of the data channel. S33 may occur before S31, or occur after S31, or occur simultaneously with S31. FIG. 3 uses an example in which S33 occurs before S31. Because S33 is only an optional step, and is not necessarily performed, an arrow representing S33 in FIG. 3 is set in a dashed line. For example, the first message is higher layer signaling (for example, RRC signaling or a media access control control element (MAC CE)), a system message, or the like. Such a configuration manner may be considered as a semi-static configuration manner.

Alternatively, in another feasible indication method, the transmission resource of the data channel (for example, the first data channel) is configured in a predefined manner. For example, it is specified, in the predefined manner, that an MCS index corresponding to the data channel used by the terminal device to receive a paging message is 2.

Certainly, the transmission resource of the data channel may alternatively be indicated in another manner. This is not specifically limited. The transmission resource of the data channel may include one or more of the following parameters of the data channel: a time domain resource, a frequency domain resource, a transport block size (TBS), a modulation and demodulation scheme (for example, a modulation and coding scheme (MCS)), or demodulation reference signal (DMRS) configuration.

If whether the WUS is sent is used to indicate, to the terminal device, whether to receive the data channel, if the network device sends the first WUS, it indicates that the terminal device is indicated to receive the first data channel, where the first data channel may carry a paging message and/or a short message in this case; if the network device does not send the first WUS, it indicates that the terminal device is indicated not to receive the first data channel, where the first data channel may carry neither a paging message nor a short message in this case. Alternatively, in another case, regardless of whether the first data channel carries a paging message and/or a short message, the network device sends the first WUS. For example, the first WUS may have two states (for example, two sequences). If the first WUS is in a first state (for example, a first sequence), the terminal device is indicated to receive the first data channel, where the first data channel may carry the paging message and/or the short message in this case; if the first WUS is in a second state (for example, a second sequence), the terminal device is indicated not to receive the first data channel, where the first data channel may carry neither the paging message nor the short message in this case. The carrying the paging message and/or the short message may be carrying the paging message, carrying the short message, or carrying the paging message and the short message.

In embodiments of this application, for example, whether the WUS is sent is used to indicate, to the terminal device, whether to receive the data channel. However, it is clear that the technical solution in embodiments of this application can also be applied to a scenario in which two states of the WUS are used to indicate, to the terminal device, whether to receive the data channel.

The short message may indicate whether a system message changes, indicate whether to receive earthquake and tsunami warning system (ETWS) information or commercial mobile alert service (CMAS) information, or indicate whether the system message changes and indicate whether to receive the ETWS information or the CMAS information. For example, the short message may include eight bits, where one bit may indicate whether the system message changes, another bit may indicate whether to receive the ETWS information or the CMAS information, and remaining six bits are temporarily reserved.

It can be learned that the first data channel may carry the paging message, carry the short message, or carry the paging message and the short message. That is, the first data channel may carry different content. The terminal device needs to know content carried on the first data channel, and therefore indication needs to be performed to the terminal device. Different indication manners may be provided in embodiments of this application, and are described below by using examples.

In a first indication manner, indication is performed by using an indication field included in the first data channel.

For example, the first data channel may include the indication field, and the indication field may be used to indicate that the first data channel carries the paging message, indicate that the first data channel carries the short message, or indicate that the first data channel carries the paging message and the short message. For example, different values (or different states of the bit field) of bits included in the indication field may be used to indicate different content. After receiving the first data channel, the terminal device may determine, based on a state of the indication field, content carried on the first data channel. For example, the indication field includes two bits. For an indication manner of the indication field, refer to Table 2.

TABLE 2

| Bit field state | Indicated content |
| --- | --- |
| 00 | (Reserved) |
| 01 | The first data channel carries only the paging message |
| 10 | The first data channel carries only the short message |
| 11 | The first data channel carries the paging message and the short message |

That the first data channel carries only the paging message may be understood as follows: The first data channel carries the paging message but does not carry the short message. In addition, the first data channel may further carry other information. The foregoing descriptions do not mean that the first data channel carries only the paging message but does not carry any other information. Similarly, that the first data channel carries only the short message may be understood as follows: The first data channel carries the short message but does not carry the paging message. In addition, the first data channel may further carry other information. The foregoing descriptions do not mean that the first data channel carries only the short message but does not carry any other information.

The indication manner in Table 2 may be understood as joint indication performed by using the two bits in the bit field, or may be understood as that the two bits respectively indicate the paging message and the short message. For example, a high-order bit of the two bits is used to indicate the short message. If a value of the bit is "1", it indicates that the first data channel carries the short message. If a value of the bit is "0", it indicates that the first data channel does not carry the short message. A low-order bit of the two bits is used to indicate the paging message. If a value of the bit is "1", it indicates that the first data channel carries the paging message. If a value of the bit is "0", it indicates that the first data channel does not carry the paging message. Table 2 uses only an example in which the bit field includes two bits. It may be understood that the bit field may also include fewer bits or more bits than the two bits, and an indication manner is also similar, where joint encoding indication may be performed by using all bits included in the bit field, or the paging message and the short message may be separately indicated by using different bits included in the bit field.

The indication field included in the first data channel is used to indicate the content carried on the first data channel, so that the indication can be clearer.

In a second indication manner, indication is performed based on different manners of implementing the first WUS. Specifically, the network device may perform indication based on a type or a transmission manner of the WUS.

A manner of implementing the first WUS may be a type of the first WUS. For example, the first WUS is a first-type WUS, and is used to indicate that the first data channel includes the paging message and does not include the short message; the first WUS is a second-type WUS, and is used to indicate that the first data channel includes the short message and does not include the paging message; the first WUS is a third-type WUS, and is used to indicate that the first data channel includes the paging message and the short message.

WUSs may be classified into different types based on the transmission resources of the WUSs. For example, if one or more of time domain resources, frequency domain resources, or code domain resources of two WUSs are different, it is considered that types of the two WUSs are different. For example, a time domain resource of the first-type WUS is a first time domain resource, a time domain resource of the second-type WUS is a second time domain resource, and a time domain resource of the third-type WUS is a third time domain resource. That is, if time domain resources are different, it is considered that types of the WUSs are different. Alternatively, a frequency domain resource of the first-type WUS is a first frequency domain resource, a frequency domain resource of the second-type WUS is a second frequency domain resource, and a frequency domain resource of the third-type WUS is a third frequency domain resource. That is, if frequency domain resources are different, it is considered that types of the WUSs are different. Alternatively, a frequency domain resource of the first-type WUS is a first frequency domain resource, a frequency domain resource of the second-type WUS is a second frequency domain resource, and a frequency domain resource of the third-type WUS is a third frequency domain resource. That is, if frequency domain resources are different, it is considered that types of the WUSs are different. Alternatively, a code domain resource of the first-type WUS is a first code domain resource, a code domain resource of the second-type WUS is a second code domain resource, and a code domain resource of the third-type WUS is a third code domain resource. That is, if code domain resources are different, it is considered that types of the WUSs are different. The code domain resource includes, for example, one or more of a sequence, a scrambling code, or a mask.

Different types of WUSs are used to indicate different content carried on the data channel, and there is no need to occupy a corresponding bit in the data channel for indication. This helps save a capacity of the data channel, so that the data channel can carry more information.

Certainly, in addition to the foregoing two indication manners, the content carried on the data channel may be indicated in another manner. For example, additional signaling may be alternatively used to indicate the content carried on the data channel. A specific indication manner is not limited.

In addition, there are also different carrying manners in which the data channel may carry the paging message, or may carry the short message. The following uses the first data channel as an example for description.

Figure 4A:
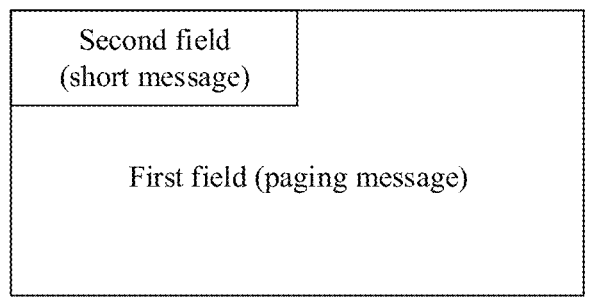
FIG. 4A to FIG. 4C are several schematic diagrams in which a field is not reused according to an embodiment of this application.
Figure 4B:
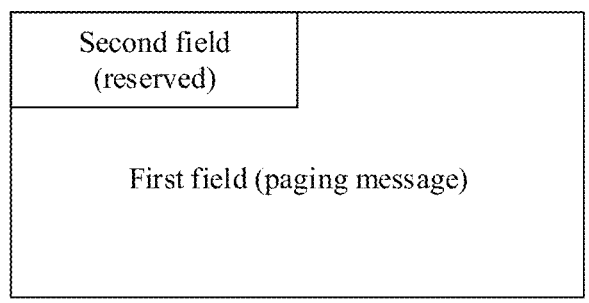
Figure 4C:
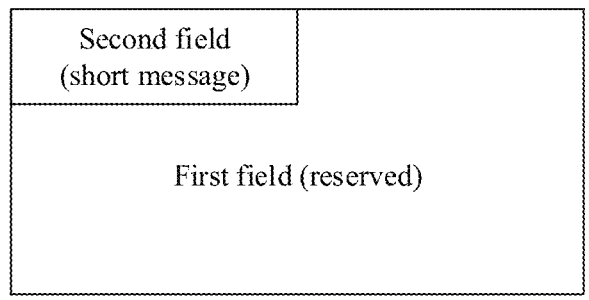

For example, a carrying manner is that a field carrying a message is always used to carry the message and is not used for other purposes, that is, the field is not reused. For example, the first data channel includes a first field and a second field, the first field is used to carry the paging message, and the second field is used to carry the short message. The first field includes one or more bits, and the second field includes one or more bits. Alternatively, a "field" may also be referred to as a "field" or a "bit group", or may have another name. The name does not constitute a limitation on a feature. Refer to FIG. 4A. If the first data channel carries the paging message and the short message, the paging message is carried in the first field, and the short message is carried in the second field. Alternatively, refer to FIG. 4B. If the first data channel carries the paging message but does not carry the short message, the paging message is carried in the first field, and the second field is reserved. Alternatively, refer to FIG. 4C. If the first data channel carries the short message but does not carry the paging message, the short message is carried in the second field, and the first field is reserved.

That is, a field that carries a message is always used to carry the message and is not used for other purposes. If the message is not carried, the field is reserved. In this way, when interpreting the data channel, the terminal device may identify an obtained message based on a corresponding field, so that the terminal device identifies the message more accurately. This also helps enable the terminal device to interpret the data channel according to a same rule, and implementation is simple.

Figure 5A:
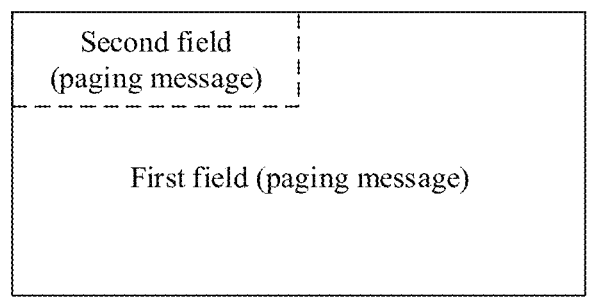
FIG. 5A and FIG. 5B are several schematic diagrams in which a field may be reused according to an embodiment of this application.
Figure 5B:
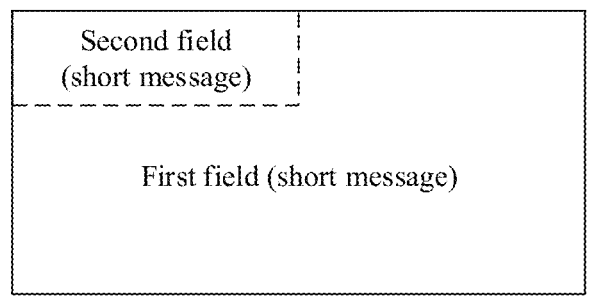

For another example, another carrying manner is that, a usage of a field is not unique, and the field may carry a message of one type and a message of another type, that is, the field can be reused. For example, the first data channel includes a first field and a second field, the first field includes one or more bits, and the second field includes one or more bits. Still refer to FIG. 4A. If the first data channel carries the paging message and the short message, the paging message is carried in the first field, and the short message is carried in the second field. Alternatively, refer to FIG. 5A. If the first data channel carries the paging message but does not carry the short message, the paging message is carried in the first field and the second field. Alternatively, refer to FIG. 5B. If the first data channel carries the short message but does not carry the paging message, the short message is carried in the first field and the second field. In FIG. 5A and FIG. 5B, the first field and the second field may be together considered as one field, and a dashed line in the figures is merely used to indicate original first field and second field, and cannot be considered as a boundary used when a corresponding message is carried.

It may be considered that a field is not dedicated to carrying a specific message. For a field, if a data channel does not carry a message that the field should carry, the field may be alternatively used to carry another message. In this manner, transmission resource utilization can be improved, an encoding bit rate can be reduced as much as possible, and a bit error rate can also be reduced.

As described above, the K WUSs correspond to the N data channels, in other words, there is a correspondence between the WUSs and the data channels. The correspondence between the WUSs and the data channels may be preconfigured by the network device. For example, the data channel is a PDSCH. For example, when configuring a PDSCH for the terminal device, the network device may configure a WUS corresponding to the PDSCH (for example, configure a sequence corresponding to the corresponding WUS or a transmission resource of the WUS for the PDSCH). Alternatively, when configuring a WUS for the terminal device, the network device may configure a PDSCH or PDSCHs corresponding to the WUS (for example, configure a transmission resource of the corresponding PDSCH for the WUS). Alternatively, the network device may configure a series of WUSs and a series of PDSCHs. Each WUS has a corresponding index, and each PDSCH also has a corresponding index. The network device configures a correspondence between the two indexes, so that there is a correspondence between the WUSs and the PDSCHs. For example, the network device may configure a quantity of WUSs corresponding to each PDSCH in a specific periodicity. The network device may send preconfigured information to the terminal device. After receiving a WUS, the terminal device may determine, based on the preconfigured information, a PDSCH corresponding to the WUS. Alternatively, the correspondence between the WUSs and the data channels may be preconfigured in the terminal device. Alternatively, the correspondence between the WUSs and the data channels may be specified in a protocol. This is not specifically limited. In conclusion, after receiving a WUS, the terminal device may know a data channel corresponding to the WUS, so as to receive the data channel corresponding to the WUS.

The K WUSs correspond to the N data channels. The following describes several implementations of the correspondence.

1. K is equal to 1, and N is equal to 1.

Figure 6A:
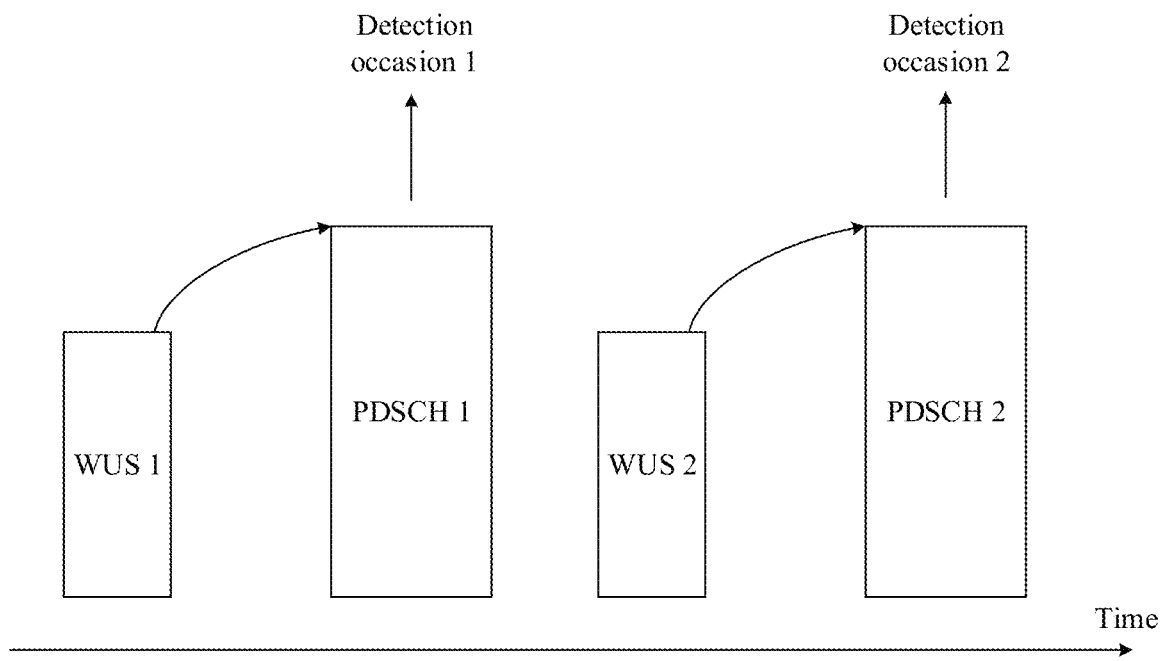
FIG. 6A to FIG. 6F are schematic diagrams of several correspondences between K WUSs and N data channels according to an embodiment of this application.

It may be understood that the K WUSs are the first WUS, and the N data channels are the first data channel. That is, the WUS and the data channel are in one-to-one correspondence. In this manner, each data channel that may carry the paging message and/or the short message corresponds to one WUS that is before the data channel. If the terminal device detects a WUS, the terminal device may receive a data channel corresponding to the WUS. Refer to FIG. 6A. For example, a WUS 1 is the first WUS, and a PDSCH 1 is the first data channel. In addition, FIG. 6A further includes a WUS 2, for example, a second WUS, and a PDSCH 2 is a second data channel corresponding to the second WUS. The PDSCH 1 corresponds to a detection occasion 1, and the PDSCH 2 corresponds to a detection occasion 2. The detection occasion 1 and the detection occasion 2 may be different detection occasions, or may be a same detection occasion. FIG. 6A is used to indicate a one-to-one correspondence between WUSs and data channels.

It should be noted that the detection occasion in embodiments of this application may be periodic. Therefore, the same detection occasion may be a same detection occasion in a same periodicity, or may be same detection occasions in different periodicities. Alternatively, in another understanding manner, the same detection occasion may also be understood as configuration of the same detection occasion. For example, if detection occasions 1 occur in both a periodicity 1 and a periodicity 2, the detection occasion 1 in the periodicity 1 and the detection occasion 1 in the periodicity 1 are a same detection occasion, and the detection occasion 1 in the periodicity 1 and the detection occasion 1 in the periodicity 2 are also considered as same detection occasions.

A concept of a detection occasion is introduced in embodiments of this application. One detection occasion may include one or more data channels. The detection occasion is not consecutive in time domain, but only includes one or more data channels. It may be understood that one detection occasion is a set of the one or more data channels, or one detection occasion is a set of occasions for receiving the one or more data channels. Alternatively, the "detection occasion" may have another name, for example, referred to as a "paging resource", or referred to as a "downlink channel resource", or referred to as a "data channel resource". The name does not constitute a limitation on a technical feature. It may also be considered that the "detection occasion" is an extension of a "paging occasion", and indicates a set of data channels that carry the paging message and/or the short message.

Optionally, the first WUS and the first data channel are quasi co-located (QCLed). There may be two cases in which the first WUS and the first data channel are quasi co-located. One case is that the first WUS and the first data channel are quasi co-located. The other case is that the first WUS and a DMRS corresponding to the first data channel are quasi co-located. This case may be considered as an indirect reflection of quasi co-location, to be specific, the first WUS and the DMRS corresponding to the first data channel are quasi co-located, and the first data channel and the DMRS are also quasi co-located, so that the first WUS and the first data channel are quasi co-located.

That a WUS and a data channel are quasi co-located indicates that some transmission characteristics of a port sending the WUS are the same as those of a port sending the data channel. For example, one or more of the following parameters: an average gain, a receive spatial parameter, a Doppler frequency shift, a delay spread, or the like, of the data channel are the same as those of the WUS. An advantage of quasi co-location between the WUS and the data channel is that the terminal device may determine, based on the received WUS, signal strength of the data channel corresponding to the WUS. For example, if a signal of the WUS is strong, the terminal device may determine that a signal of the data channel corresponding to the WUS is strong; if a signal of the WUS is weak, the terminal device may determine that a signal of a data channel corresponding to the WUS is weak. Alternatively, an advantage is that the terminal device may adjust a receive beam based on the received WUS, to better receive the data channel corresponding to the WUS, so that received signal quality is improved.

2. K is equal to 1, N is greater than 1, and the N data channels are transmitted on a same detection occasion, in other words, the N data channels correspond to the same detection occasion.

This manner is equivalent to that the K WUSs are the first WUS, and the first data channel is one of the N data channels.

Figure 6B:
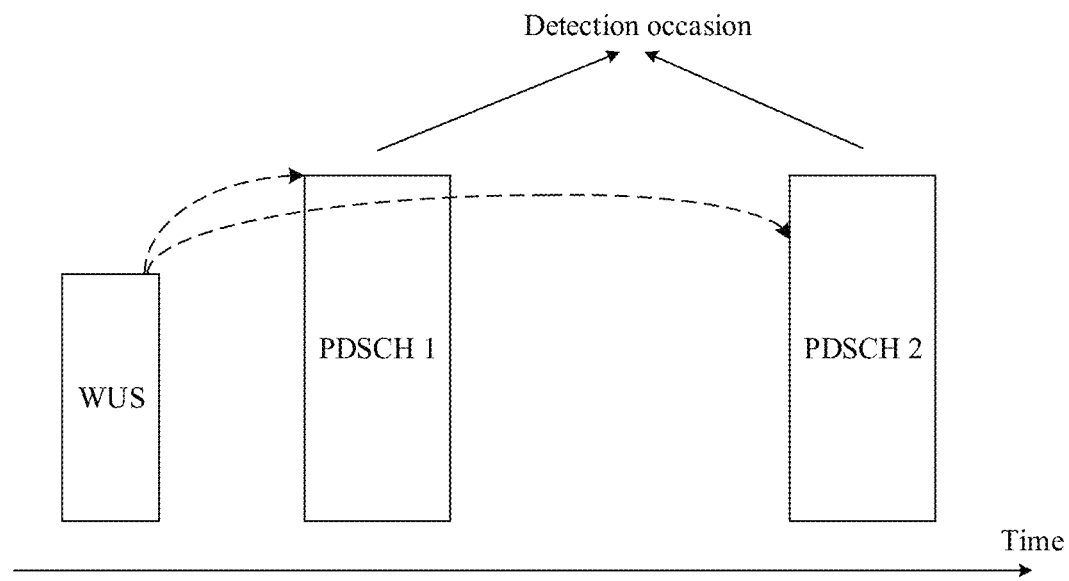

The N data channels may be all data channels corresponding to one detection occasion, or may be some data channels corresponding to one detection occasion. In this manner, one WUS (for example, the first WUS) may correspond to a plurality of data channels that are on one detection occasion. If detecting the first WUS, the terminal device may receive the plurality of data channels corresponding to the first WUS. The plurality of data channels correspond to one detection occasion. Refer to FIG. 6B. A WUS in FIG. 6B is, for example, the first WUS, and a PDSCH 1 and a PDSCH 2 are two data channels corresponding to the first WUS.

All data channels corresponding to one WUS may be used to transmit same information, for example, transmit a same paging message, or transmit a same short message. In this case, if one WUS corresponds to a plurality of data channels, the terminal device only needs to receive one of the data channels, and does not need to receive all the data channels, to reduce power consumption of the terminal device. For example, the first WUS corresponds to a plurality of data channels. The terminal device may determine a data channel with a strongest signal in the plurality of data channels, receives only the data channel, and does not need to receive other data channels. Receiving the data channel with the strongest signal may help improve received signal quality.

The WUS may be sent through a beam. For example, a WUS 1 corresponds to a PDSCH 1. In this case, a beam used to send the WUS 1 and a beam used to send the PDSCH 1 may be a same beam (or beams in a same direction). The terminal device has received the WUS. Therefore, the terminal device can evaluate signal quality of the data channels based on signal quality of the WUS, and may roughly determine the signal quality of the data channels before receiving the data channels, so that the terminal device can select the data channel with the strongest signal (in other words, best signal quality) for receiving. Alternatively, before sending the data channel, the network device may send an SSB, and there is also a correspondence between an SSB and a data channel from a perspective of a beam. Therefore, the terminal device may also evaluate signal quality of the corresponding data channel based on the received SSB, and may roughly determine the signal quality of the data channel before receiving the data channel, so that the terminal device can select the data channel with the strongest signal for receiving.

Optionally, the first WUS and the first data channel may be quasi co-located. For explanations, beneficial effects, and the like of quasi co-location, refer to the foregoing descriptions.

3. K is greater than 1, N is greater than 1, and the N data channels are transmitted on a same detection occasion.

In this manner, the first WUS may be one of the K WUSs, and the first data channel may be a data channel that is in the N data channels and that corresponds to the first WUS. For example, K may be equal to N, or may not be equal to N. If K is equal to N, it may be considered that the K WUSs are in one-to-one correspondence with the N data channels. If K is not equal to N, for example, in a manner in which K is less than N, one WUS may correspond to one or more data channels, and different WUSs may correspond to a same quantity or different quantities of data channels.

This manner may be understood as follows: One detection occasion corresponds to a plurality of data channels, and the plurality of data channels correspond to a plurality of WUSs. A quantity of the data channels may be the same as or different from a quantity of the WUSs. The N data channels may be all data channels corresponding to one detection occasion, or may be some data channels corresponding to one detection occasion. In this manner, the K WUSs may correspond to a plurality of data channels that are on one detection occasion. If the terminal device detects one of the K WUSs, the terminal device may receive a data channel corresponding to the WUS.

Figure 6C:
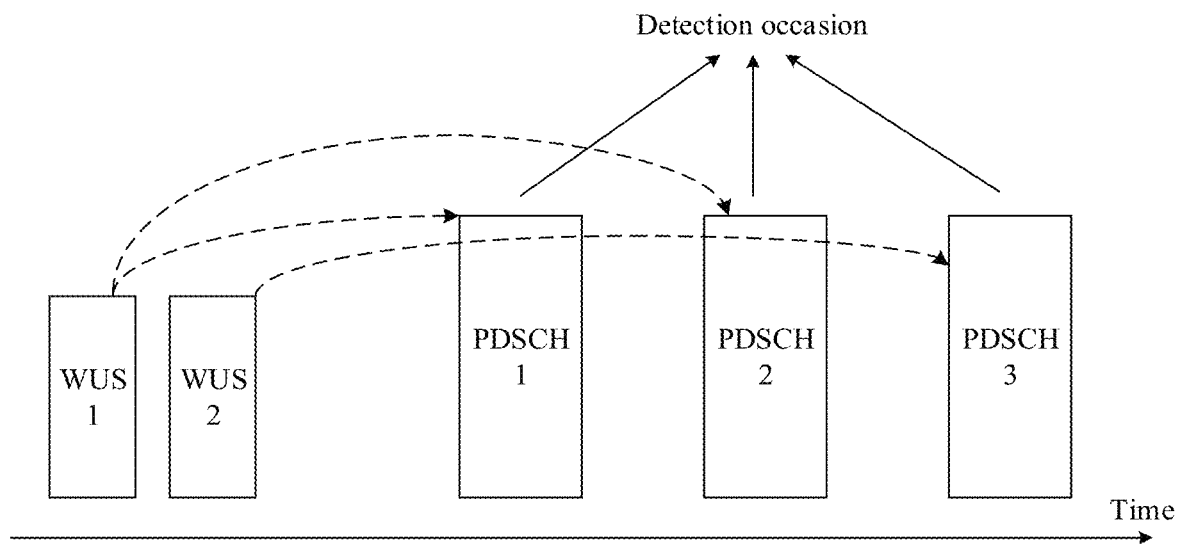

Refer to FIG. 6C. In FIG. 6C, an example in which K=2 and N=3 is used. A WUS 1 represents the first WUS in the K WUSs, and a WUS 2 represents a second WUS in the K WUSs. A PDSCH 1 and a PDSCH 2 represent data channels corresponding to the first WUS, and a PDSCH 3 represents a data channel corresponding to the second WUS. In other words, the first WUS corresponds to two data channels, the second WUS corresponds to one data channel, and the three data channels correspond to a same detection occasion. In FIG. 6C, a quantity of WUSs is not equal to a quantity of data channels. Therefore, the WUSs and the data channels are not in one-to-one correspondence. In this manner, the network device may flexibly configure quantities of data channels that carry the paging message and/or the short message and that are in different beam directions, and accurately indicate the data channels by using the WUSs.

Figure 6D:
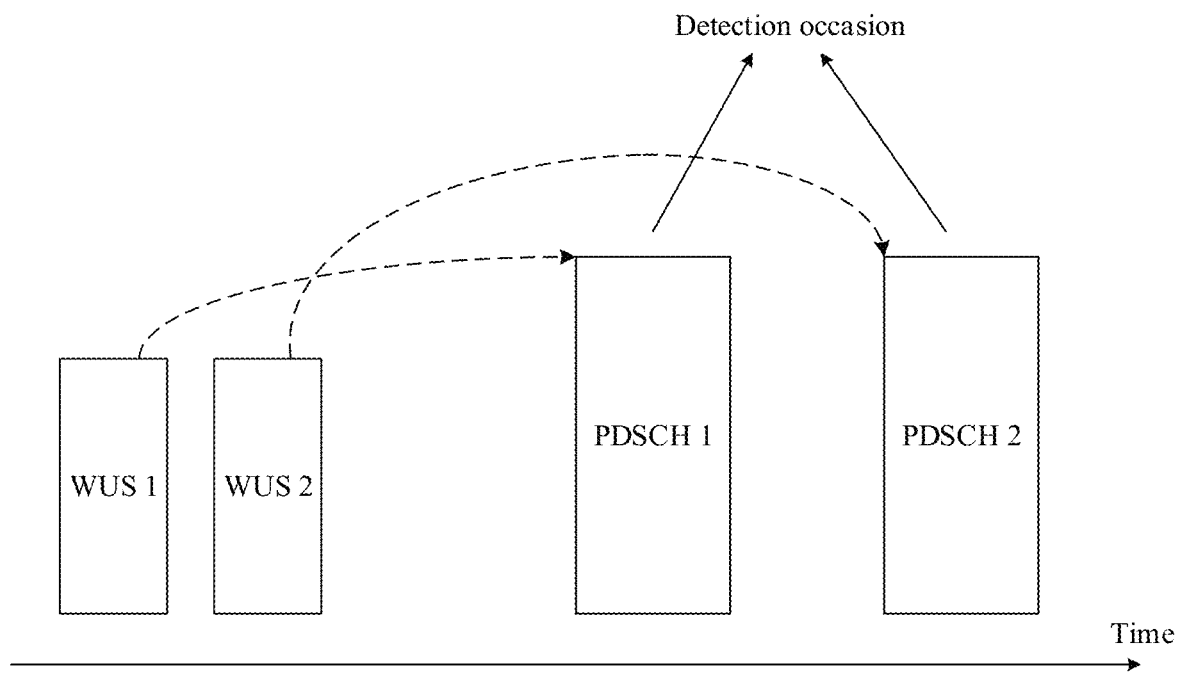

Alternatively, refer to FIG. 6D. In FIG. 6D, an example in which K=2 and N=2 is used. A WUS 1 represents the first WUS in the K WUSs, and a WUS 2 represents a second WUS in the K WUSs. A PDSCH 1 represents a data channel corresponding to the first WUS, and a PDSCH 2 represents a data channel corresponding to the second WUS. In other words, the first WUS corresponds to one data channel, the second WUS corresponds to one data channel, and the two data channels correspond to a same detection occasion. In FIG. 6D, a quantity of WUSs is equal to a quantity of data channels. Therefore, the WUSs and the data channels are in one-to-one correspondence. In this manner, the terminal device may uniquely determine, based on a detected WUS, one data channel for receiving, so that complexity of receiving and demodulating the paging message and/or the short message is reduced. On this premise, the network device may indicate all data channels that are on one detection occasion by using a minimum quantity of WUSs.

If the WUSs and the data channels are in one-to-one correspondence, optionally, one of the K WUSs and a data channel corresponding to the WUS may be quasi co-located. For example, each of the K WUSs and a data channel corresponding to the WUS may be quasi co-located. For explanations, beneficial effects, and the like of quasi co-location, refer to the foregoing descriptions.

If the WUSs and the data channels are in one-to-one correspondence, a difference from the foregoing first manner is as follows. In the foregoing first manner, refer to FIG. 6A. After sending a WUS, the network device sends a data channel corresponding to the WUS; the network device then sends a WUS, and then sends a data channel corresponding to the WUS; and so on. In this manner, refer to FIG. 6D, the network device sends the K WUSs, and then sends the N data channels. That is, sending sequences of the WUSs and the data channels are different.

Similarly, all data channels corresponding to one WUS may be used to transmit same information, for example, transmit a same paging message, or transmit a same short message. In this case, if one WUS corresponds to a plurality of data channels, the terminal device only needs to receive one of the data channels, and does not need to receive all the data channels, to reduce power consumption of the terminal device. For example, the first WUS corresponds to a plurality of data channels. The terminal device may determine a data channel with a strongest signal in the plurality of data channels, receives only the data channel, and does not need to receive other data channels. Receiving the data channel with the strongest signal may help improve received signal quality.

Data channels corresponding to different WUSs may be used to transmit different information. In this case, the data channels corresponding to the different WUSs still needs to be separately received by the terminal device. In this way, more information can be transmitted through the data channels. Alternatively, all the data channels corresponding to the K WUSs may transmit same information. In this case, the terminal device needs to receive only one of the N data channels corresponding to the K WUSs. For example, the terminal device may receive a data channel with a strongest signal. The terminal device receives only one data channel, so that the terminal device does not receive a data channel that is with excessively low signal power and that cannot be correctly demodulated. This helps reduce power consumption of the terminal device.

4. K is equal to N, and the N data channels correspond to one detection occasion.

If K=N=1, the fourth manner may be considered as the foregoing first manner. If both K and N are greater than 1, the fourth manner may be considered as a special example of the foregoing third manner. In this case, the first WUS may be one of the K WUSs, and the first data channel may be a data channel that is in the N data channels and that corresponds to the first WUS.

In the fourth manner, the WUSs may be in one-to-one correspondence with the data channels. This manner may be understood as follows: One detection occasion corresponds to a plurality of data channels, the plurality of data channels correspond to a plurality of WUSs, and a quantity of the data channels is the same as a quantity of the WUSs. The N data channels may be all data channels corresponding to one detection occasion, or may be some data channels corresponding to one detection occasion. In this manner, the K WUSs may correspond to K data channels that are on one detection occasion. If the terminal device detects one of the K WUSs, the terminal device may receive a data channel corresponding to the WUS. For an example of this manner, continue to refer to FIG. 6D.

Optionally, one of the K WUSs and the data channel corresponding to the WUS may be quasi co-located. For example, each of the K WUSs and a data channel corresponding to the WUS may be quasi co-located. For explanations, beneficial effects, and the like of quasi co-location, refer to the foregoing descriptions.

A difference between the fourth manner and the foregoing first manner is as follows. In the foregoing first manner, refer to FIG. 6A. After sending a WUS, the network device sends a data channel corresponding to the WUS; the network device then sends a WUS, and then sends a data channel corresponding to the WUS; and so on. In this manner, refer to FIG. 6D, the network device sends the K WUSs, and then sends the N data channels. That is, sending sequences of the WUSs and the data channels are different.

5. K is equal to 1, N is greater than 1, and the N data channels correspond to a plurality of detection occasions, in other words, the N data channels are transmitted on the plurality of detection occasions.

This manner is equivalent to that the K WUSs are the first WUS, and the first data channel is one of the N data channels.

Figure 6E:
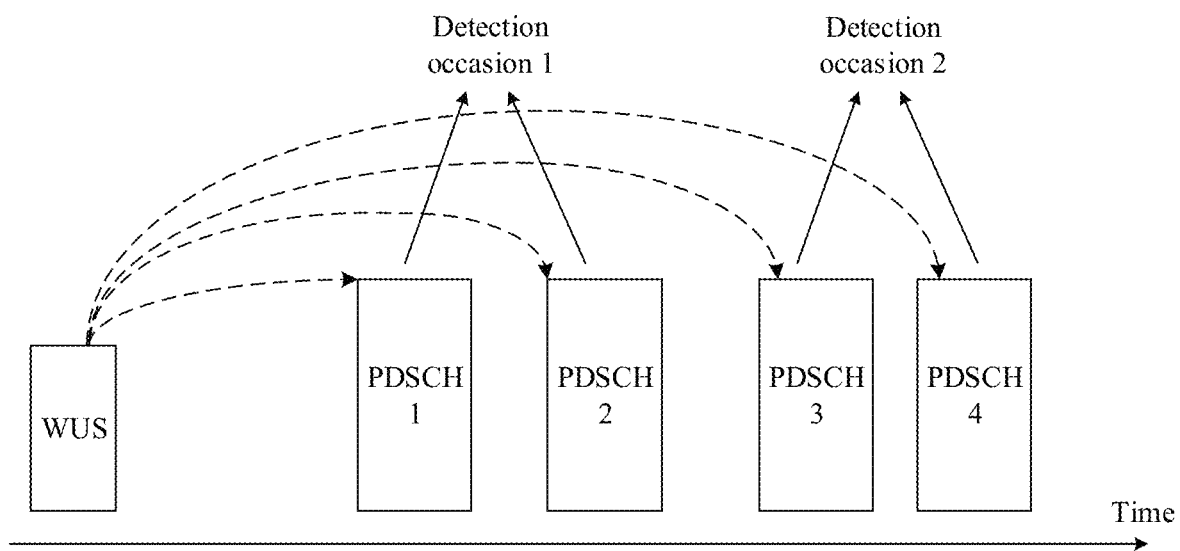

The N data channels may be all data channels corresponding to the plurality of detection occasions, or may be some data channels corresponding to the plurality of detection occasions. In this manner, the first WUS may correspond to a plurality of data channels that are on the plurality of detection occasions. If detecting the first WUS, the terminal device may receive the plurality of data channels corresponding to the first WUS. The plurality of data channels correspond to the plurality of detection occasions. Refer to FIG. 6E. A WUS in FIG. 6E is, for example, the first WUS, a PDSCH 1 and a PDSCH 2 correspond to a detection occasion 1, a PDSCH 3 and a PDSCH 4 correspond to a detection occasion 2, and all the four PDSCHs are data channels corresponding to the first WUS.

For example, the first WUS may be specific to one terminal device, or may be specific to a plurality of terminal devices. If the first WUS is specific to the plurality of terminal devices, and different terminal devices correspond to different detection occasions, the network device needs to send only the first WUS, and after receiving the first WUS, the different terminal devices perform detection of corresponding data channels on respective detection occasions. When the network device needs to page the plurality of terminal devices, resources and energy consumption for WUS sending can be reduced in this manner.

All data channels corresponding to one WUS may be used to transmit same information, for example, transmit a same paging message, or transmit a same short message. In this case, if one WUS corresponds to a plurality of data channels, the terminal device only needs to receive one of the data channels, and does not need to receive all the data channels, to reduce power consumption of the terminal device. For example, the first WUS corresponds to a plurality of data channels. The terminal device may determine a data channel with a strongest signal in the plurality of data channels, receives only the data channel, and does not need to receive other data channels. Receiving the data channel with the strongest signal may help improve received signal quality.

Alternatively, because data channels corresponding to the first WUS are located on different detection occasions, a case may occur in which data channels on one detection occasion are used to transmit same information, and data information on different detection occasions is used to transmit different information. In this case, the terminal device needs to receive only one of the data channels that correspond to the first WUS and that are on one detection occasion, and the terminal device still needs to receive data channels that correspond to the first WUS and that are on different detection occasions. In this way, more information can be transmitted.

6. The N data channels correspond to M detection occasions, and the K WUSs correspond to K data channels on each of the M detection occasions, where M is a positive integer.

In this manner, the first WUS may be one of the K WUSs, and the first data channel may be a data channel that is in the N data channels and that corresponds to the first WUS. K may be equal to N, or may not be equal to N. If K is equal to N, M=1. If K=N=M=1, the sixth manner may be considered as the foregoing first manner.

This manner may be understood as follows: Each of the M detection occasions corresponds to one or more data channels, and the K data channels corresponding to each detection occasion correspond to the K WUSs. The K data channels may be all data channels corresponding to one detection occasion, or may be some data channels corresponding to one detection occasion. In this manner, the K WUSs may correspond to M*K data channels that are on the M detection occasions, that is, N=M*K. If the terminal device detects one of the K WUSs, the terminal device may receive data channels corresponding to the WUS.

Figure 6F:
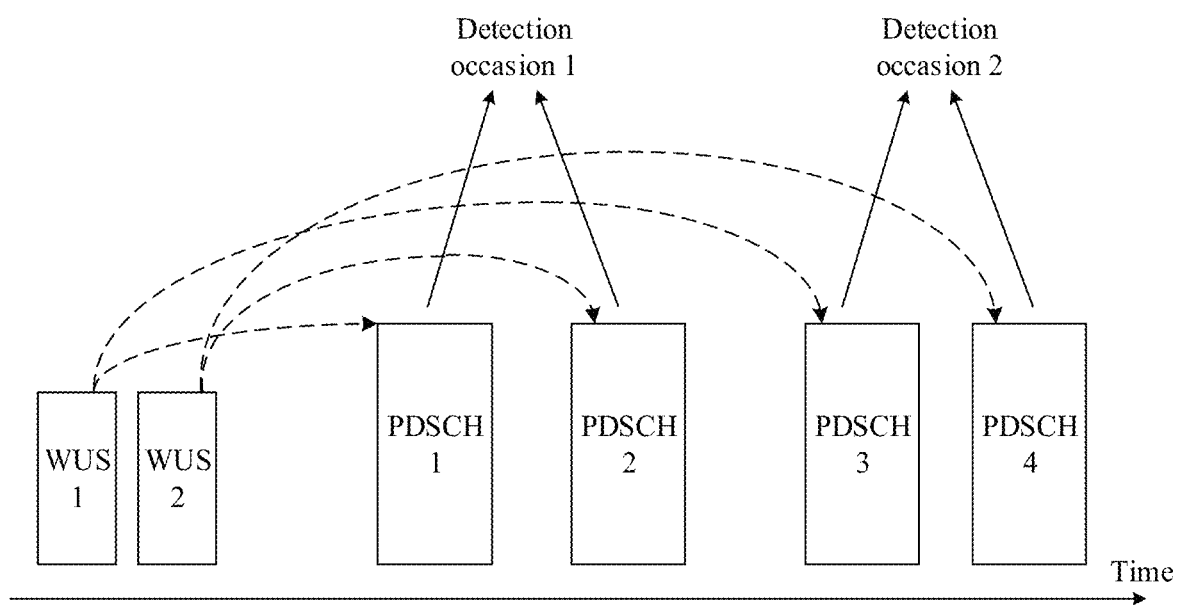

Refer to FIG. 6F. In FIG. 6F, an example in which K=2 and M=2 is used. A WUS 1 represents the first WUS in the K WUSs, and a WUS 2 represents a second WUS in the K WUSs. A PDSCH 1 and a PDSCH 2 represent data channels included on a detection occasion 1, and a PDSCH 3 and a PDSCH 4 represent data channels included on a detection occasion 2. The first WUS corresponds to the PDSCH 1 and the PDSCH 3, and the second WUS corresponds to the PDSCH 2 and the PDSCH 4. To be specific, the first WUS and the second WUS each correspond to two data channels on each of the M detection occasions. For example, on the detection occasion 1, the first WUS corresponds to the PDSCH 1, and the second WUS corresponds to the PDSCH 2. For example, on the detection occasion 2, the first WUS corresponds to the PDSCH 3, and the second WUS corresponds to the PDSCH 4. Actually, it may also be understood that each of the K WUSs corresponds to one data channel on each of the M detection occasions. In this case, each of the K WUSs corresponds to M data channels in total, and the K WUSs correspond to M*K data channels in total.

Optionally, one of the K WUSs and the data channels corresponding to the WUS may be quasi co-located. For example, each of the K WUSs and the data channels corresponding to the WUS may be quasi co-located. For example, in FIG. 6F, the first WUS corresponds to the PDSCH 1 and the PDSCH 3. In this case, the first WUS, the PDSCH 1, and the PDSCH 3 may all be quasi co-located. For explanations, beneficial effects, and the like of quasi co-location, refer to the foregoing descriptions.

For example, the K WUSs may be specific to one terminal device, or may be specific to a plurality of terminal devices. If the K WUSs are specific to the plurality of terminal devices, and different terminal devices correspond to different detection occasions, the network device needs to send only the K WUSs, and after receiving the K WUSs, the different terminal devices perform detection of corresponding data channels on respective detection occasions. When the network device needs to page the plurality of terminal devices, resources and energy consumption for WUS sending can be reduced in this manner.

All data channels corresponding to one WUS may be used to transmit same information, for example, transmit a same paging message, or transmit a same short message. In this case, if one WUS corresponds to a plurality of data channels, the terminal device only needs to receive one of the data channels, and does not need to receive all the data channels, to reduce power consumption of the terminal device. For example, one WUS corresponds to a plurality of data channels. The terminal device may determine a data channel with a strongest signal in the plurality of data channels, receives only the data channel, and does not need to receive other data channels. Receiving the data channel with the strongest signal may help improve received signal quality.

Alternatively, because data channels corresponding to one WUS are located on different detection occasions, a case may occur in which data channels on one detection occasion are used to transmit same information, and data information on different detection occasions is used to transmit different information. In this case, the terminal device needs to receive only one of the data channels that correspond to the WUS and that are on one detection occasion, and the terminal device still needs to receive data channels that correspond to the WUS and that are on different detection occasions. In this way, more information can be transmitted.

In any one of the foregoing first implementation to the foregoing sixth implementation, the network device may indicate, by sending the WUS, the terminal device to receive the paging message and/or the short message carried on a preconfigured/predefined resource, to avoid energy consumption and resource overheads for sending the DCI. The terminal device may accurately determine, based on the received WUS and a correspondence between a WUS and the preconfigured/predefined resource, resources on which the paging message and/or the short message need/needs to be received, to avoid energy consumption overheads caused by DCI blind detection, and reduce energy consumption overheads caused by unnecessary data channel buffering and demodulation.

Several correspondence manners between the K WUSs and the N data channels are described above. In addition to the manners described above, the K WUSs may correspond to the N data channels in another manner.

S32: The network device sends the first data channel, and the terminal device receives the first data channel from the network device.

After receiving the first WUS, the terminal device may receive, based on the first WUS, the first data channel corresponding to the first WUS. The network device may first send the K WUSs, and then send the N data channels. If the terminal device receives the WUSs, the terminal device may receive the corresponding data channels. If the terminal device does not receive the WUSs, the terminal device may not receive the data channels corresponding to the WUSs. Transmission resources of the N data channels may be configured based on the first message, may be configured in a predefined manner, or the like. In conclusion, the transmission resources can be known by the terminal device.

Table 1 above shows comparison between energy consumption of a current mechanism with a WUS and energy consumption of a mechanism without a WUS. Table 3 below shows comparison between energy consumption of the technical solution in embodiments of this application and energy consumption of two current technical solutions.

TABLE 3

| Paging manner | | PDCCH + PDSCH | WUS + PDCCH + PDSCH | WUS + PDSCH (in embodiments of this application) |
|---|---|---|---|---|
| Energy consumption on a network side | When there is paging | Medium (Sending the PDCCH + the PDSCH) | Relatively high (Sending all the WUS, the PDCCH, and the PDSCH) | Medium (Sending the WUS + the PDSCH) |
| | When there is no paging | Low (Not sending the PDCCH or the PDSCH) | Low (Not sending the WUS, the PDCCH, or the PDSCH) | Low (Not sending the WUS or the PDSCH) |
| Energy consumption on a terminal device side | When there is paging | Medium (Blind DCI detection + PDSCH demodulation based on DCI) | High (WUS detection + blind DCI detection + PDSCH demodulation based on DCI) | Medium (WUS detection + receiving and demodulating the PDSCH corresponding to the WUS) |
| | When there is no paging | Medium (Blind DCI detection) | Low (WUS detection) | Low (WUS detection) |

It can be learned that compared with the two current manners, the technical solution in embodiments of this application help reduce energy consumption of the terminal device and the network device.

In embodiments of this application, if the network device needs to page the terminal device or send the short message to the terminal device, the network device only needs to send a wake-up signal for indication. After receiving the wake-up signal, the terminal device can receive a paging message and/or the short message, and the network device does not need to send DCI. Because the network device does not need to send the DCI, power consumption and resource overheads caused by sending the DCI are reduced. Because the terminal device does not need to perform DCI blind detection, power consumption caused by DCI blind detection is reduced. In addition, because the terminal device does not need to demodulate the DCI, power consumption caused by DCI demodulation is further reduced.

With reference to the accompanying drawings, the following describes apparatuses configured to implement the foregoing methods in embodiments of this application. Therefore, all the foregoing content may be used in subsequent embodiments. Repeated content is not described again.

Figure 7:
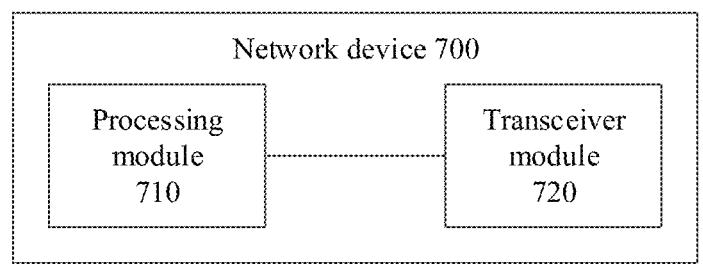
FIG. 7 is a schematic block diagram of a network device according to an embodiment of this application.

FIG. 7 is a schematic block diagram of a communication apparatus 700 according to an embodiment of this application. For example, the communication apparatus 700 is a network device 700.

The network device 700 includes a processing module 710 and a transceiver module 720. For example, the network device 700 may be a network device, or may be a chip used in the network device or another combined device, component, or the like that has a function of the foregoing network device. When the network device 700 is the network device, the transceiver module 720 may be a transceiver. The transceiver may include an antenna, a radio frequency circuit, and the like. The processing module 710 may be a processor, for example, a baseband processor. The baseband processor may include one or more central processing units (CPUs). When the network device 700 is the component having the function of the foregoing network device, the transceiver module 720 may be a radio frequency unit, and the processing module 710 may be a processor, for example, a baseband processor. When the network device 700 is a chip system, the transceiver module 720 may be an input/output interface of the chip (for example, a baseband chip), and the processing module 710 may be a processor of the chip system, and may include one or more central processing units. It should be understood that the processing module 710 in this embodiment of this application may be implemented by a processor or a processor-related circuit component, and the transceiver module 720 may be implemented by a transceiver or a transceiver-related circuit component.

For example, the processing module 710 may be configured to perform all operations performed by the network device in the embodiment shown in FIG. 3 except receiving and sending operations, for example, S31 to S33, and/or configured to support another process of the technology described in this specification. The transceiver module 720 may be configured to perform all receiving operations performed by the network device in the embodiment shown in FIG. 3, for example, S31 to S33, and/or configured to support another process of the technology described in this specification.

In addition, the transceiver module 720 may be a functional module, and the functional module can complete both a sending operation and a receiving operation. For example, the transceiver module 720 may be configured to perform all sending operations and receiving operations performed by the network device in the embodiment shown in FIG. 3. For example, when performing the sending operation, the transceiver module 720 may be considered as a sending module, and when performing the receiving operation, the transceiver module 720 may be considered as a receiving module. Alternatively, the transceiver module 720 may be two functional modules. The transceiver module 720 may be considered as a general term of the two functional modules. The two functional modules are a sending module and a receiving module. The sending module is configured to complete a sending operation. For example, the sending module may be configured to perform all sending operations performed by the network device in any embodiment of the embodiment shown in FIG. 3. The receiving module is configured to complete a receiving operation. For example, the receiving module may be configured to perform all receiving operations performed by the network device in the embodiment shown in FIG. 3.

The processing module 710 is configured to send a first wake-up signal via the transceiver module 720, where the first wake-up signal is used to indicate a terminal device to receive a first data channel, the first data channel carries a paging message and/or a short message, and the short message is used to indicate whether a system message changes and/or indicate whether to receive ETWS information or CMAS information.

The processing module 710 is further configured to send the first data channel via the transceiver module 720.

In an optional implementation, the first wake-up signal is one of K wake-up signals, the first data channel is one of N data channels, and both K and N are integers greater than or equal to 1, where K is equal to 1, and N is equal to 1;

K is equal to 1, N is greater than 1, and the N data channels are transmitted on a same detection occasion;

K is greater than 1, N is greater than 1, the N data channels are transmitted on a same detection occasion, and the K wake-up signals correspond to the N data channels;

K is equal to N, the N data channels correspond to one detection occasion, and the K wake-up signals are in one-to-one correspondence with the N data channels;

K is equal to 1, N is greater than 1, and the N data channels correspond to a plurality of detection occasions; or the N data channels correspond to M detection occasions, N=M*K, and the K wake-up signals are in one-to-one correspondence with K data channels on each of the M detection occasions.

In an optional implementation, the first wake-up signal and the first data channel are quasi co-located, or the first wake-up signal and a DMRS corresponding to the first data channel are quasi co-located.

In an optional implementation, content carried on the first data channel is explicitly indicated by using the first wake-up signal. Specifically, the first data channel includes an indication field, and the indication field is used to indicate that the first data channel carries the paging message, carries the short message, or carries the paging message and the short message.

In an optional implementation, content carried on the first data channel is implicitly indicated by using the first wake-up signal. Specifically, the content carried on the first data channel may be indicated by using a type of the first wake-up signal or a transmission form of the first wake-up signal. For example, the first wake-up signal is a first-type wake-up signal, and is used to indicate that the first data channel includes the paging message and does not include the short message;

the first wake-up signal is a second-type wake-up signal, and is used to indicate that the first data channel includes the short message and does not include the paging message; or the first wake-up signal is a third-type wake-up signal, and is used to indicate that the first data channel includes the paging message and the short message.

The foregoing wake-up signals of three types are merely examples. The terminal device may determine, by using the type or the transmission manner of the first wake-up signal, the content carried on the first data channel.

In an optional implementation, the first data channel includes a first field and a second field, where
when the first data channel does not include the paging message, the first field is reserved, and the second field is used to carry the short message; or when the first data channel does not include the short message, the second field is reserved, and the first field is used to carry the paging message; or
when the first data channel does not include the paging message and includes the short message, the first field and the second field are used to carry the short message; or when the first data channel does not include the short message and includes the paging message, the first field and the second field are used to carry the paging message.

In an optional implementation, a transmission resource of the first data channel is predefined, or is configured based on a first message, the transmission resource includes one or more of a time domain resource, a frequency domain resource, or a modulation and demodulation scheme, and the first message is a system message or a radio resource control message.

Figure 8:
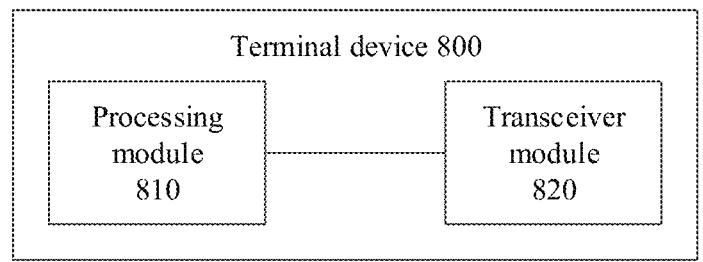
FIG. 8 is a schematic block diagram of a terminal device according to an embodiment of this application.

FIG. 8 is a schematic block diagram of a communication apparatus 800 according to an embodiment of this application. For example, the communication apparatus 800 is a terminal device 800.

The terminal device 800 includes a processing module 810 and a transceiver module 820. For example, the terminal device 800 may be a network device, or may be a chip used in the terminal device or another combined device, component, or the like that has a function of the foregoing terminal device. When the terminal device 800 is the terminal device, the transceiver module 820 may be a transceiver. The transceiver may include an antenna, a radio frequency circuit, and the like. The processing module 810 may be a processor, for example, a baseband processor. The baseband processor may include one or more central processing units (CPUs). When the terminal device 800 is the component having the function of the foregoing terminal device, the transceiver module 820 may be a radio frequency unit, and the processing module 810 may be a processor, for example, a baseband processor. When the terminal device 800 is a chip system, the transceiver module 820 may be an input/output interface of the chip (for example, a baseband chip), and the processing module 810 may be a processor of the chip system, and may include one or more central processing units. It should be understood that the processing module 810 in this embodiment of this application may be implemented by a processor or a processor-related circuit component, and the transceiver module 820 may be implemented by a transceiver or a transceiver-related circuit component.

For example, the processing module 810 may be configured to perform all operations performed by the terminal device in the embodiment shown in FIG. 3 except receiving and sending operations, for example, S32 (or S31 to S33, or S31 and S32), and/or configured to support another process of the technology described in this specification. The transceiver module 820 may be configured to perform all receiving operations performed by the terminal device in the embodiment shown in FIG. 3, for example, S31 to S33, and/or configured to support another process of the technology described in this specification.

In addition, the transceiver module 820 may be a functional module, and the functional module can complete both a sending operation and a receiving operation. For example, the transceiver module 820 may be configured to perform all sending operations and receiving operations performed by the terminal device in the embodiment shown in FIG. 3. For example, when performing the sending operation, the transceiver module 820 may be considered as a sending module, and when performing the receiving operation, the transceiver module 820 may be considered as a receiving module. Alternatively, the transceiver module 820 may be two functional modules. The transceiver module 820 may be considered as a general term of the two functional modules. The two functional modules are a sending module and a receiving module. The sending module is configured to complete a sending operation. For example, the sending module may be configured to perform all sending operations performed by the terminal device in any embodiment of the embodiment shown in FIG. 3. The receiving module is configured to complete a receiving operation. For example, the receiving module may be configured to perform all receiving operations performed by the terminal device in the embodiment shown in FIG. 3.

The transceiver module 820 is configured to receive a first wake-up signal, where the first wake-up signal is used to indicate the terminal device to receive a first data channel, the first data channel carries a paging message and/or a short message, and the short message is used to indicate whether a system message changes and/or indicate whether to receive ETWS information or CMAS information; and
the processing module 810 is configured to perform detection of the first data channel via the transceiver module 820.

Alternatively,
the processing module 810 is configured to receive a first wake-up signal via the transceiver module 820, where the first wake-up signal is used to indicate the terminal device to receive a first data channel, the first data channel carries a paging message and/or a short message, and the short message is used to indicate whether a system message changes and/or indicate whether to receive ETWS information or CMAS information; and
the processing module 810 is configured to perform detection of the first data channel via the transceiver module 820.

In an optional implementation, the first wake-up signal is one of K wake-up signals, the first data channel is one of N data channels, and both K and N are integers greater than or equal to 1, where
K is equal to 1, and N is equal to 1;
K is equal to 1, N is greater than 1, and the N data channels are transmitted on a same detection occasion;
K is greater than 1, N is greater than 1, the N data channels are transmitted on a same detection occasion, and the K wake-up signals correspond to the N data channels;
K is equal to N, the N data signals correspond to one detection occasion, and the K wake-up signals are in one-to-one correspondence with the N data signals;
K is equal to 1, N is greater than 1, and the N data signals correspond to a plurality of detection occasions; or
the N data signals correspond to M detection occasions, N=M*K, and the K wake-up signals are in one-to-one correspondence with K data signals on each of the M detection occasions.

In an optional implementation, the first wake-up signal and the first data channel are quasi co-located, or the first wake-up signal and a DMRS corresponding to the first data channel are quasi co-located.

In an optional implementation, content carried on the first data channel is explicitly indicated by using the first wake-up signal. Specifically, the first data channel includes an indication field, and the indication field is used to indicate that the first data channel carries the paging message, carries the short message, or carries the paging message and the short message.

In an optional implementation, content carried on the first data channel is implicitly indicated by using the first wake-up signal. Specifically, the content carried on the first data channel may be indicated by using a type of the first wake-up signal or a transmission form of the first wake-up signal. For example,

- the first wake-up signal is a first-type wake-up signal, and is used to indicate that the first data channel includes the paging message and does not include the short message;
- the first wake-up signal is a second-type wake-up signal, and is used to indicate that the first data channel includes the short message and does not include the paging message; or
- the first wake-up signal is a third-type wake-up signal, and is used to indicate that the first data channel includes the paging message and the short message.

The foregoing wake-up signals of three types are merely examples. The terminal device may determine, by using the type or the transmission manner of the first wake-up signal, the content carried on the first data channel.

In an optional implementation, the first data channel includes a first field and a second field, where

- when the first data channel does not include the paging message, the first field is reserved, and the second field is used to carry the short message; or when the first data channel does not include the short message, the second field is reserved, and the first field is used to carry the paging message; or
- when the first data channel does not include the paging message and includes the short message, the first field and the second field are used to carry the short message; or when the first data channel does not include the short message and includes the paging message, the first field and the second field are used to carry the paging message.

In an optional implementation, a transmission resource of the first data channel is predefined, or is configured based on a first message, the transmission resource includes one or more of a time domain resource, a frequency domain resource, or a modulation and demodulation scheme, and the first message is a system message or a radio resource control message.

An embodiment of this application further provides a communication apparatus. The communication apparatus may be a terminal device or a circuit. The communication apparatus may be configured to perform actions of the terminal device in the foregoing method embodiment.

Figure 9:
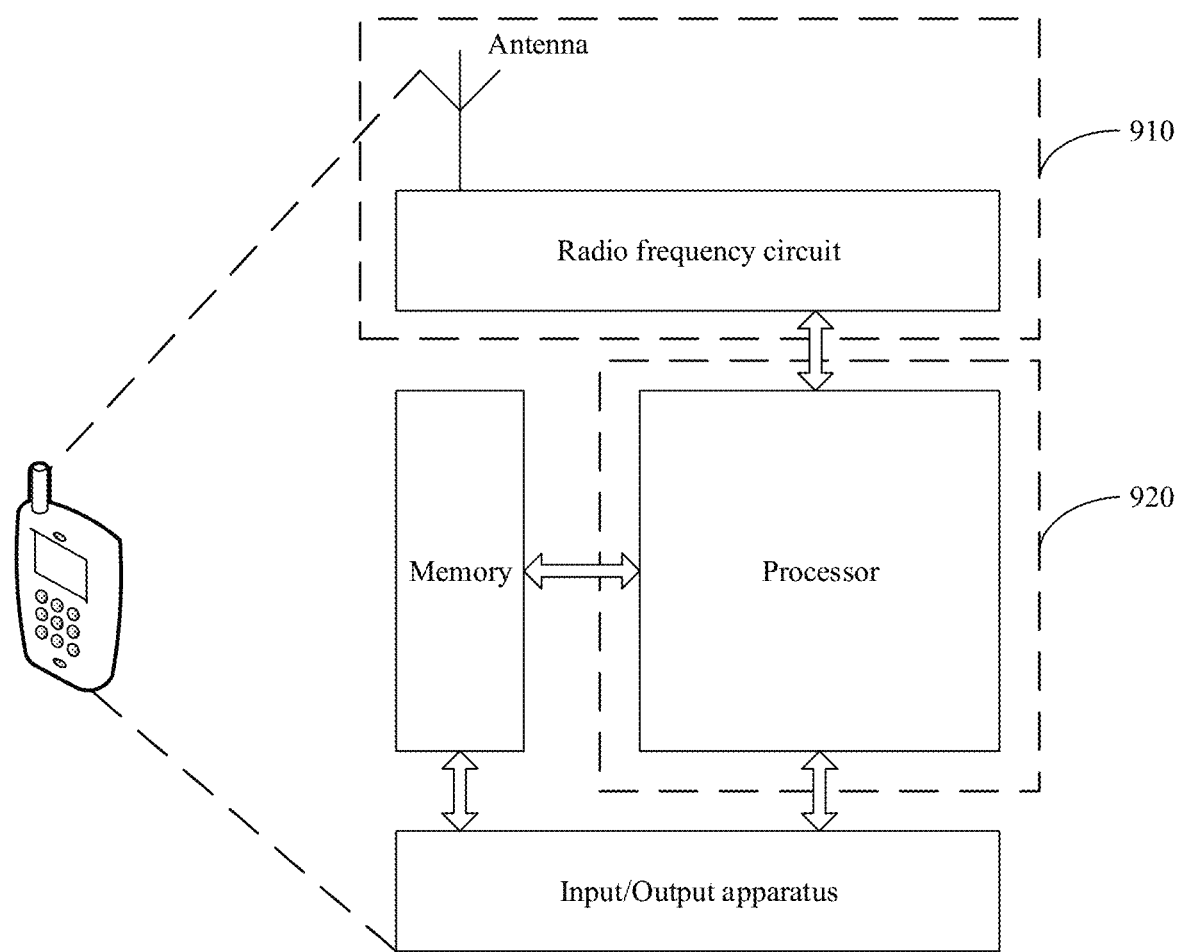
FIG. 9 is a schematic block diagram of a communication apparatus according to an embodiment of this application.

Optionally, when the communication apparatus is the terminal device, FIG. 9 is a simplified schematic diagram of a structure of a terminal device. For ease of understanding and illustration, in FIG. 9, a mobile phone is used as an example of the terminal device. As shown in FIG. 9, the terminal device includes a processor, a memory, a radio frequency circuit, an antenna, and an input/output apparatus. The processor is mainly configured to: process a communication protocol and communication data, control the terminal device, execute a software program, process data of the software program, and the like. The memory is configured to store the software program and the data. The radio frequency circuit is mainly configured to: perform conversion between a baseband signal and a radio frequency signal, and process the radio frequency signal. The antenna is mainly configured to receive and send a radio frequency signal in a form of an electromagnetic wave. The input/output apparatus, for example, a touchscreen, a display, or a keyboard, is mainly configured to receive data entered by a user and output data to the user. It should be noted that some types of terminal devices may not have the input/output apparatus.

When data needs to be sent, the processor performs baseband processing on the to-be-sent data, and then outputs a baseband signal to the radio frequency circuit. The radio frequency circuit performs radio frequency processing on the baseband signal and then sends a radio frequency signal to the outside in a form of an electromagnetic wave through the antenna. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data. For ease of description, FIG. 9 shows only one memory and one processor. In an actual terminal device product, there may be one or more processors and one or more memories. The memory may also be referred to as a storage medium, a storage device, or the like. The memory may be disposed independent of the processor, or may be integrated with the processor. This is not limited in embodiments of this application.

In embodiments of this application, the antenna and the radio frequency circuit that have receiving and sending functions may be considered as a transceiver unit of the terminal device (where the transceiver unit may be a functional unit, and the functional unit can implement a sending function and a receiving function; or the transceiver unit may include two functional units: a receiving unit that can implement a receiving function and a sending unit that can implement a sending function), and a processor that has a processing function is considered as a processing unit of the terminal device. As shown in FIG. 9, the terminal device includes a transceiver unit 910 and a processing unit 920. The transceiver unit may also be referred to as a transceiver, a transceiver machine, a transceiver apparatus, or the like. The processing unit may also be referred to as a processor, a processing board, a processing module, a processing apparatus, or the like. Optionally, a component that is in the transceiver unit 910 and that is configured to implement the receiving function may be considered as the receiving unit, and a component that is in the transceiver unit 910 and that is configured to implement the sending function may be considered as the sending unit. That is, the transceiver unit 910 includes the receiving unit and the sending unit. The transceiver unit sometimes may also be referred to as a transceiver machine, a transceiver, a transceiver circuit, or the like. The receiving unit sometimes may also be referred to as a receiver machine, a receiver, a receive circuit, or the like. The sending unit sometimes may also be referred to as a transmitter machine, a transmitter, a transmit circuit, or the like.

It should be understood that the transceiver unit 910 is configured to perform a sending operation and a receiving operation on a terminal device side in the foregoing method embodiment, and the processing unit 920 is configured to perform an operation other than the sending and receiving operations of the terminal device in the foregoing method embodiment.

For example, in an implementation, the processing unit 920 may be configured to perform all operations performed by the terminal device in the embodiment shown in FIG. 3 except receiving and sending operations, for example, S32 (or S31 to S33, or S31 and S32), and/or configured to support another process of the technology described in this specification. The transceiver unit 910 may be configured to perform all receiving operations performed by the terminal device in the embodiment shown in FIG. 3, for example, S31 to S33, and/or configured to support another process of the technology described in this specification.

When the communication apparatus is a chip apparatus or circuit, the apparatus may include a transceiver unit and a processing unit. The transceiver unit may be an input/output circuit and/or a communication interface. The processing unit is an integrated processor, a microprocessor, or an integrated circuit.

Figure 10:
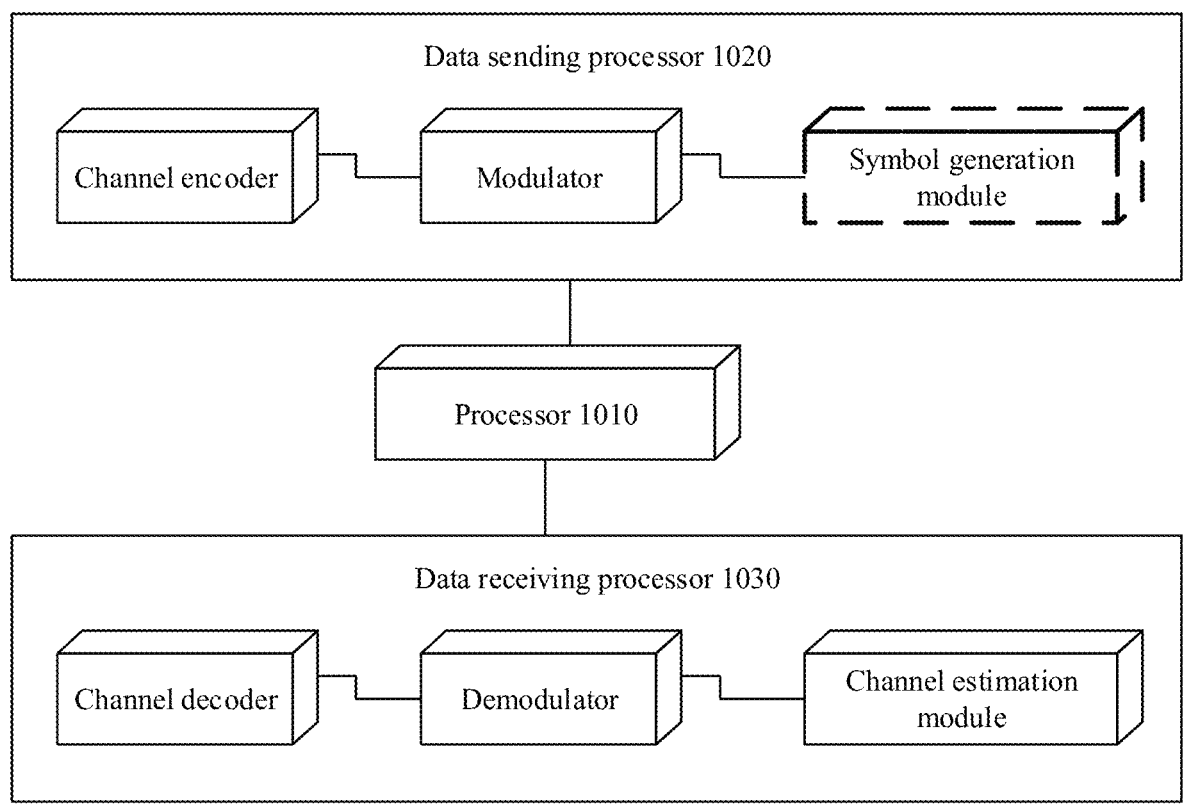
FIG. 10 is another schematic block diagram of a communication apparatus according to an embodiment of this application.

When the communication apparatus in this embodiment is the terminal device, refer to the device shown in FIG. 10. In an example, the device may implement a function similar to that of the processing module 810 in FIG. 8. In FIG. 10, the device includes a processor 1010, a data sending processor 1020, and a data receiving processor 1030. The processing module 810 in the foregoing embodiment may be the processor 1010 in FIG. 10, and implement a corresponding function. The transceiver module 820 in the foregoing embodiment may be the data sending processor 1020 and/or the data receiving processor 1030 in FIG. 10, and implement a corresponding function. Although FIG. 10 shows a channel encoder and a channel decoder, it may be understood that the modules do not constitute a limitation on this embodiment, but are merely examples.

Figure 11:
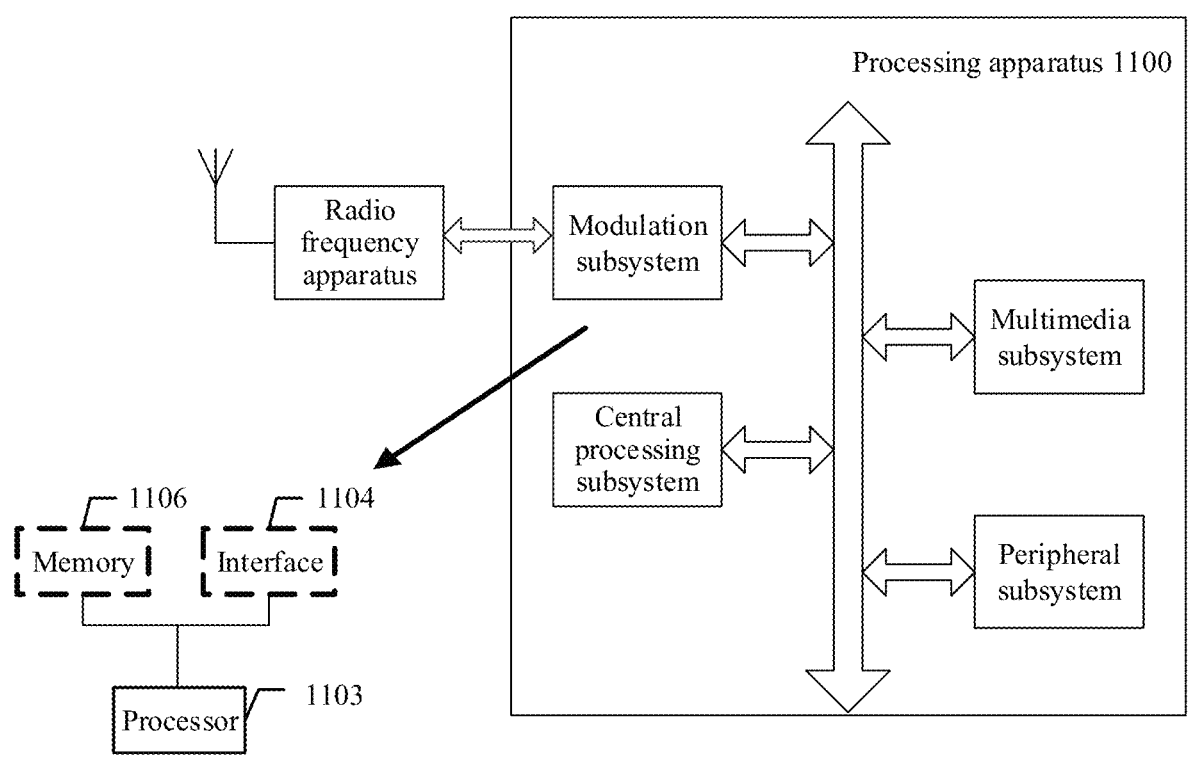
FIG. 11 is still another schematic block diagram of a communication apparatus according to an embodiment of this application.

FIG. 11 shows another form of this embodiment. A processing apparatus 1100 includes modules such as a modulation subsystem, a central processing subsystem, and a peripheral subsystem. The communication apparatus in this embodiment may be used as the modulation subsystem. Specifically, the modulation subsystem may include a processor 1103 and an interface 1104. The processor 1103 completes a function of the foregoing processing module 810, and the interface 1104 completes a function of the foregoing transceiver module 820. In another variation, the modulation subsystem includes a memory 1106, a processor 1103, and a program that is stored in the memory 1106 and that can be run on the processor. When executing the program, the processor 1103 implements the method on a terminal device side in the foregoing method embodiment. It should be noted that the memory 1106 may be non-volatile or may be volatile, and may be located inside the modulation subsystem or in the processing apparatus 1100, provided that the memory 1106 can be connected to the processor 1103.

Figure 12:
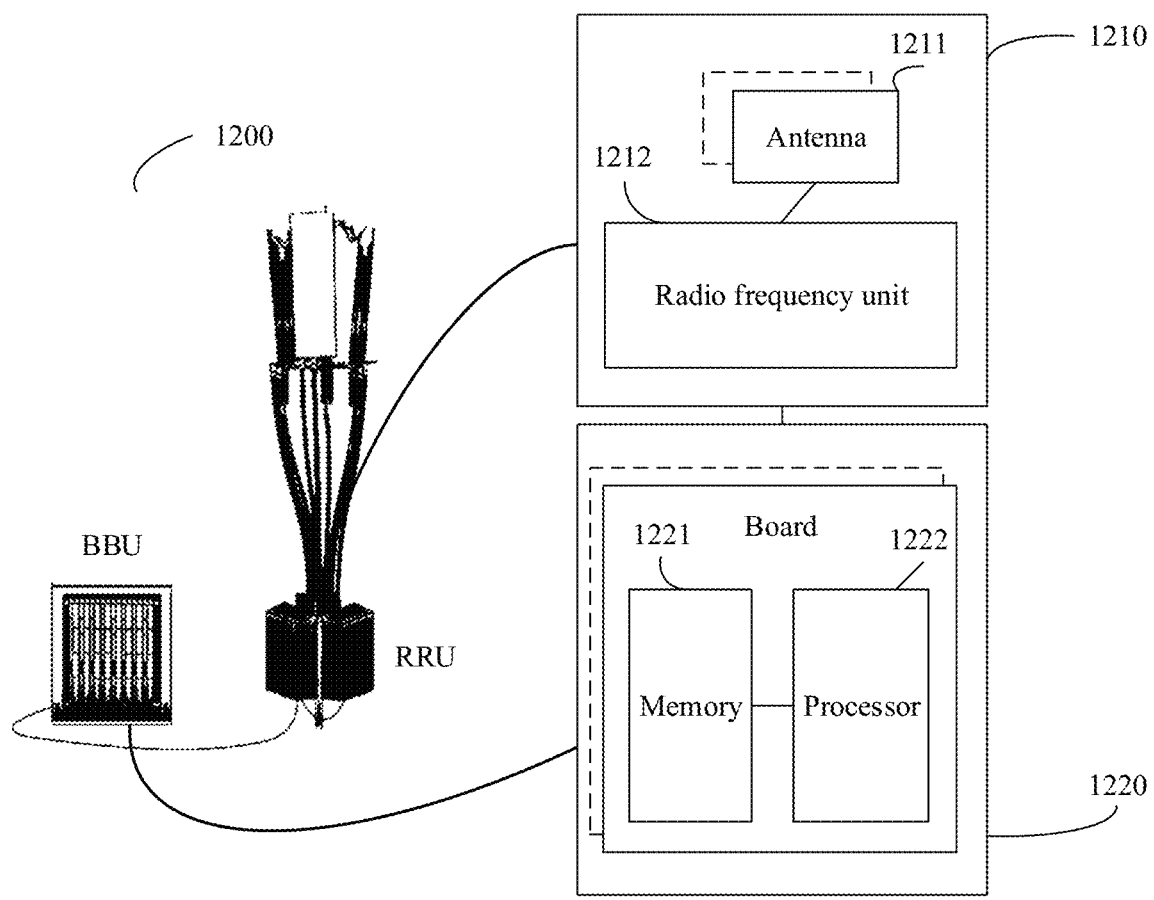
FIG. 12 is yet another schematic block diagram of a communication apparatus according to an embodiment of this application.

When the apparatus in embodiments of this application is a network device, the apparatus may be shown in FIG. 12. The apparatus 1200 includes one or more radio frequency units, such as a remote radio unit (RRU) 1210 and one or more baseband units (BBUs) (which may also be referred to as a digital unit (DU)) 1220. The RRU 1210 may be referred to as a transceiver module. The transceiver module may include a sending module and a receiving module, or the transceiver module may be a module that can implement sending and receiving functions. The transceiver module may correspond to the transceiver module 720 in FIG. 7. Optionally, the transceiver module may also be referred to as a transceiver machine, a transceiver circuit, a transceiver, or the like, and may include at least one antenna 1211 and a radio frequency unit 1212. The RRU 1210 is mainly configured to: receive and send a radio frequency signal, and perform conversion between a radio frequency signal and a baseband signal. For example, the RRU 1210 is configured to send indication information to a terminal device. The BBU 1220 is mainly configured to: perform baseband processing, control a base station, and the like. The RRU 1210 and the BBU 1220 may be physically disposed together, or may be physically disposed separately, that is, in a distributed base station.

The BBU 1220 is a control center of the base station, and may also be referred to as a processing module. The BBU 1220 may correspond to the processing module 710 in FIG. 7, and is mainly configured to implement a baseband processing function such as channel coding, multiplexing, modulation, or spreading. For example, the BBU (processing module) may be configured to control the base station to perform an operation procedure related to the network device in the foregoing method embodiment, for example, generate the indication information.

In an example, the BBU 1220 may include one or more boards, and a plurality of boards may jointly support a radio access network (for example, an LTE network) in a single access standard, or may separately support radio access networks (for example, an LTE network, a 5G network, or another network) in different access standards. The BBU 1220 further includes a memory 1221 and a processor 1222. The memory 1221 is configured to store necessary instructions and necessary data. The processor 1222 is configured to control the base station to perform a necessary action, for example, configured to control the base station to perform the operation procedure related to the network device in the foregoing method embodiment. The memory 1221 and the processor 1222 may serve one or more boards. In other words, a memory and a processor may be deployed on each board. Alternatively, a plurality of boards may share a same memory and a same processor. In addition, a necessary circuit may be further disposed on each board.

An embodiment of this application provides a communication system. The first communication system may include the terminal device in the embodiment shown in FIG. 3 and the network device in the embodiment shown in FIG. 3. For example, the terminal device is the terminal device 800 in FIG. 8. For example, the network device is the network device 700 in FIG. 7.

An embodiment of this application further provides a computer-readable storage medium. The computer-readable storage medium stores a computer program. When the computer program is executed by a computer, the computer may implement a procedure related to a network device in the embodiment shown in FIG. 3 provided in the foregoing method embodiment.

An embodiment of this application further provides a computer-readable storage medium. The computer-readable storage medium is configured to store a computer program. When the computer program is executed by a computer, the computer may implement a procedure related to a terminal device in the embodiment shown in FIG. 3 provided in the foregoing method embodiment.

An embodiment of this application further provides a computer program product. The computer program product is configured to store a computer program. When the computer program is executed by a computer, the computer may implement a procedure related to a network device in the embodiment shown in FIG. 3 provided in the foregoing method embodiment.

An embodiment of this application further provides a computer program product. The computer program product is configured to store a computer program. When the computer program is executed by a computer, the computer may implement a procedure related to a terminal device in the embodiment shown in FIG. 3 provided in the foregoing method embodiment.

It should be understood that the processor mentioned in embodiments of this application may be a CPU, or may be another general-purpose processor, a digital signal processor (DSP), an application-specific integrated circuit (ASIC), a field programmable gate array (FPGA) or another programmable logic device, a discrete gate or transistor logic device, a discrete hardware component, or the like. The general-purpose processor may be a microprocessor, or the processor may be any conventional processor or the like.

It may be understood that the memory in embodiments of this application may be a volatile memory or a nonvolatile memory, or may include both a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM) and is used as an external cache. Through example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

It should be noted that, when the processor is a general-purpose processor, a DSP, an ASIC, an FPGA or another programmable logic device, a discrete gate or transistor logic device, or a discrete hardware component, the memory (a storage module) is integrated into the processor.

It should be noted that, the memory described in this specification is intended to include but is not limited to these memories and memories of any other appropriate types.

It should be understood that sequence numbers of the foregoing processes do not mean execution sequences in various embodiments of this application. The execution sequences of the processes should be determined based on functions and internal logic of the processes, and should not be construed as any limitation on implementation processes of embodiments of this application.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraints of the technical solution. A person skilled in the art may use different methods to implement the described functions for each particular application, but it should not be considered that the implementation goes beyond the scope of this application.

A person skilled in the art may clearly understand that, for the purpose of convenient and brief description, for detailed working processes of the foregoing system, apparatuses, and units, refer to corresponding processes in the foregoing method embodiment. Details are not described herein again.

In the several embodiments provided in this application, it should be understood that the disclosed system, apparatuses, and method may be implemented in other manners. For example, the described apparatus embodiments are merely examples. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, that is, may be located in one position, or may be distributed on a plurality of network units. Some or all of the units may be selected based on actual requirements to achieve the objectives of the solution in embodiments.

In addition, functional units in embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solution of this application essentially, or the part contributing to a conventional technology, or some of the technical solution may be implemented in a form of a software product. The computer software product is stored in a storage medium, and includes several instructions for instructing a computer device (which may be a personal computer, a server, a network device, or the like) to perform all or some of the steps of the method described in embodiments of this application. The computer-readable storage medium may be any usable medium accessible by a computer. By way of example but not limitation, the computer-readable medium may include a random access memory (RAM), a read-only memory (ROM), an electrically erasable programmable read-only memory (EEPROM), a compact disc read-only memory (CD-ROM), a universal serial bus flash disk, a removable hard disk, or another optical disc storage; a disk storage medium or another magnetic storage device; or any other medium that can be used to carry or store expected program code in a form of an instruction or a data structure and that can be accessed by a computer.

The foregoing descriptions are merely specific implementations of this application, but are not intended to limit the protection scope of embodiments of this application. Any variation or replacement readily figured out by a person skilled in the art within the technical scope disclosed in embodiments of this application shall fall within the protection scope of embodiments of this application. Therefore, the protection scope of embodiments of this application shall be subject to the protection scope of the claims.

What is claimed is:

1. A signal sending method, comprising:
sending a first wake-up signal, wherein the first wake-up signal indicates a terminal device to receive a first data channel, the first data channel carries at least one of a paging message or a short message, the short message indicates at least one of whether a system message changes or whether to receive earthquake and tsunami warning system (ETWS) information or commercial mobile alert service (CMAS) information, the first data channel comprises a first field and a second field, and wherein:

when the first data channel does not comprise the paging message, the first field is reserved, and the second field carries the short message; or when the first data channel does not comprise the short message, the second field is reserved, and the first field carries the paging message; or when the first data channel does not comprise the paging message and comprises the short message, the first field and the second field carry the short message; or when the first data channel does not comprise the short message and comprises the paging message, the first field and the second field carry the paging message; and sending the first data channel.

2. The method according to claim 1, wherein the first wake-up signal is one of K wake-up signals, the first data channel is one of N data channels, and both K and N are integers greater than or equal to 1, and wherein:

K is equal to 1, and N is equal to 1;

K is equal to 1, N is greater than 1, and the N data channels are transmitted on a same detection occasion;

K is greater than 1, N is greater than 1, the N data channels are transmitted on a same detection occasion, and the K wake-up signals correspond to the N data channels;

K is equal to N, the N data channels correspond to one detection occasion, and the K wake-up signals are in one-to-one correspondence with the N data channels;

K is equal to 1, N is greater than 1, and the N data channels correspond to a plurality of detection occasions; or the N data channels correspond to M detection occasions, N=M*K, and the K wake-up signals are in one-to-one correspondence with K data channels on each of the M detection occasions.

3. The method according to claim 1, wherein:

the first wake-up signal and the first data channel are quasi co-located, or the first wake-up signal and a demodulation reference signal (DMRS) corresponding to the first data channel are quasi co-located.

4. The method according to claim 1, wherein the first data channel comprises an indication field, and the indication field indicates that the first data channel carries at least one of the paging message or the short message.

5. The method according to claim 1, wherein:

the first wake-up signal is a first-type wake-up signal, and indicates that the first data channel comprises the paging message and does not comprise the short message;

the first wake-up signal is a second-type wake-up signal, and indicates that the first data channel comprises the short message and does not comprise the paging message; or the first wake-up signal is a third-type wake-up signal, and indicates that the first data channel comprises the paging message and the short message.

6. The method according to claim 1, wherein:

a transmission resource of the first data channel is predefined, or is configured based on a first message, the transmission resource comprises one or more of a time domain resource, a frequency domain resource, or a modulation and demodulation scheme, and the first message is a system message or a radio resource control message.

7. The method according to claim 4, wherein the indication field comprises a plurality of states of a bit field.

8. A signal receiving method, wherein the method is applicable to a terminal device, and comprises:

receiving a first wake-up signal, wherein the first wake-up signal indicates the terminal device to receive a first data channel, the first data channel carries at least one of a paging message or a short message, the short message indicates at least one of whether a system message changes or whether to receive earthquake and tsunami warning system (ETWS) information or commercial mobile alert service (CMAS) information, the first data channel comprises a first field and a second field, and wherein:

when the first data channel does not comprise the paging message, the first field is reserved, and the second field carries the short message; or when the first data channel does not comprise the short message, the second field is reserved, and the first field carries the paging message; or when the first data channel does not comprise the paging message and comprises the short message, the first field and the second field carry the short message; or when the first data channel does not comprise the short message and comprises the paging message, the first field and the second field carry the paging message; and performing detection of the first data channel.

9. The method according to claim 8, wherein the first wake-up signal is one of K wake-up signals, the first data channel is one of N data channels, and both K and N are integers greater than or equal to 1, and wherein:

K is equal to 1, and N is equal to 1;

K is equal to 1, N is greater than 1, and the N data channels are transmitted on a same detection occasion;

K is greater than 1, N is greater than 1, the N data channels are transmitted on a same detection occasion, and the K wake-up signals correspond to the N data channels;

K is equal to N, the N data channels correspond to one detection occasion, and the K wake-up signals are in one-to-one correspondence with the N data channels;

K is equal to 1, N is greater than 1, and the N data channels correspond to a plurality of detection occasions; or the N data channels correspond to M detection occasions, N=M*K, and the K wake-up signals are in one-to-one correspondence with K data channels on each of the M detection occasions.

10. The method according to claim 8, wherein:

the first wake-up signal and the first data channel are quasi co-located, or the first wake-up signal and a demodulation reference signal (DMRS) corresponding to the first data channel are quasi co-located.

11. The method according to claim 8, wherein the first data channel comprises an indication field, and the indication field indicates that the first data channel carries at least one of the paging message or the short message.

12. The method according to claim 8, wherein:

the first wake-up signal is a first-type wake-up signal, and indicates that the first data channel comprises the paging message and does not comprise the short message;

the first wake-up signal is a second-type wake-up signal, and indicates that the first data channel comprises the short message and does not comprise the paging message; or the first wake-up signal is a third-type wake-up signal, and indicates that the first data channel comprises the paging message and the short message.

13. The method according to claim 8, wherein:
a transmission resource of the first data channel is predefined, or is configured based on a first message, the transmission resource comprises one or more of a time domain resource, a frequency domain resource, or a modulation and demodulation scheme, and the first message is a system message or a radio resource control message.

14. The method according to claim 11, wherein the indication field comprises a plurality of states of a bit field.

15. A communication apparatus, comprising:
one or more processors; and
a non-transitory computer readable medium storing a program to be executed by the one or more processors, wherein the program comprises instructions that cause the communication apparatus to perform operations comprising:
receiving a first wake-up signal, wherein the first wake-up signal indicates the communication apparatus to receive a first data channel, the first data channel carries at least one of a paging message or a short message, the short message indicates at least one of whether a system message changes or whether to receive earthquake and tsunami warning system (ETWS) information or commercial mobile alert service (CMAS) information, the first data channel comprises a first field and a second field, and wherein:
when the first data channel does not comprise the paging message, the first field is reserved, and the second field carries the short message; or when the first data channel does not comprise the short message, the second field is reserved, and the first field carries the paging message; or
when the first data channel does not comprise the paging message and comprises the short message, the first field and the second field carry the short message; or when the first data channel does not comprise the short message and comprises the paging message, the first field and the second field carry the paging message; and
performing detection of the first data channel.

16. The communication apparatus according to claim 15, wherein the first wake-up signal is one of K wake-up signals, the first data channel is one of N data channels, and both K and N are integers greater than or equal to 1, and wherein:
K is equal to 1, and N is equal to 1;
K is equal to 1, N is greater than 1, and the N data channels are transmitted on a same detection occasion;
K is greater than 1, N is greater than 1, the N data channels are transmitted on a same detection occasion, and the K wake-up signals correspond to the N data channels;
K is equal to N, the N data channels correspond to one detection occasion, and the K wake-up signals are in one-to-one correspondence with the N data channels;
K is equal to 1, N is greater than 1, and the N data channels correspond to a plurality of detection occasions; or
the N data channels correspond to M detection occasions, N=M*K, and the K wake-up signals are in one-to-one correspondence with K data channels on each of the M detection occasions.

17. The communication apparatus according to claim 15, wherein
the first wake-up signal and the first data channel are quasi co-located, or the first wake-up signal and a demodulation reference signal (DMRS) corresponding to the first data channel are quasi co-located.

18. The communication apparatus according to claim 15, wherein the first data channel comprises an indication field, and the indication field indicates that the first data channel carries at least one of the paging message or the short message.

19. The communication apparatus according to claim 15, wherein
the first wake-up signal is a first-type wake-up signal, and indicates that the first data channel comprises the paging message and does not comprise the short message;
the first wake-up signal is a second-type wake-up signal, and indicates that the first data channel comprises the short message and does not comprise the paging message; or
the first wake-up signal is a third-type wake-up signal, and indicates that the first data channel comprises the paging message and the short message.

20. The communication apparatus according to claim 15, wherein:
a transmission resource of the first data channel is predefined, or is configured based on a first message, the transmission resource comprises one or more of a time domain resource, a frequency domain resource, or a modulation and demodulation scheme, and the first message is a system message or a radio resource control message.

* * * * *